United States Patent
Tasaki et al.

(10) Patent No.: US 6,516,050 B1
(45) Date of Patent: Feb. 4, 2003

(54) DOUBLE-TALK DETECTING APPARATUS, ECHO CANCELLER USING THE DOUBLE-TALK DETECTING APPARATUS AND ECHO SUPPRESSOR USING THE DOUBLE-TALK DETECTING APPARATUS

(75) Inventors: Hirohisa Tasaki, Tokyo (JP); Bunkei Matsuoka, Tokyo (JP); Ikuo Kajiyama, Tokyo (JP); Shinya Takahashi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 188 days.

(21) Appl. No.: 09/695,296

(22) Filed: Oct. 25, 2000

Related U.S. Application Data

(63) Continuation of application No. PCT/JP00/01068, filed on Feb. 24, 2000.

(30) Foreign Application Priority Data

Feb. 25, 1999 (JP) ............................................ 11-047332

(51) Int. Cl.[7] .......................... H04M 1/00; H04M 1/24; H04B 3/20
(52) U.S. Cl. ................. 379/3; 379/406.01; 379/406.08; 370/286
(58) Field of Search ................................ 379/3, 392.01, 379/406.01, 406.02, 406.03, 406.04, 406.05, 406.06, 406.07, 406.08, 406.11, 406.12, 406.13, 406.14, 406.1, 390.02; 381/317, 318, 93, 94.1, 66, 71.11, 71.9, 71.12, 71.13; 370/286, 289, 290, 287; 455/296, 63, 67.3, 570

(56) References Cited

U.S. PATENT DOCUMENTS

| | | | | |
|---|---|---|---|---|
| 5,007,044 A | * | 4/1991 | Miyoshi et al. ............. | 379/411 |
| 5,136,577 A | * | 8/1992 | Amano et al. ............... | 379/410 |
| 5,157,653 A | * | 10/1992 | Genter ......................... | 379/410 |

(List continued on next page.)

FOREIGN PATENT DOCUMENTS

| | | |
|---|---|---|
| EP | 667700 A2 | 8/1995 |
| JP | 62176338 | 8/1987 |
| JP | 10242891 | 9/1998 |

OTHER PUBLICATIONS

"General Characteristics of International Telephone Connections and Circuits", International Telecommunication Union, vol. III, Recommendations G.101–G.181, 1989, pp. 186–221.

"Echo Canceler With Two Echo Path Models" IEEE Transactions on Communications, vol. Com–25, No. 6 (Jun. 1977) pp. 589–595.

*Primary Examiner*—Rexford Barnie
(74) *Attorney, Agent, or Firm*—Birch, Stewart, Kolasch & Birch, LLP

(57) ABSTRACT

A first pseudo-echo signal approximating an echo of a reception signal superposed on a transmission signal is produced from a delayed reception signal corresponding to a past time according to filer coefficients, and a first residual signal is produced from the first pseudo-echo signal and a delayed transmission signal. Also, the filer coefficients are renewed to reduce the first residual signal. Therefore, when a single-talk state based on a far-end caller's voice of the reception signal is changed to a double-talk state by adding a near-end caller' voice to the transmission signal, the first filter coefficients deteriorate. Also, a second pseudo-echo signal is produced from a reception signal currently received according to the first filter coefficients renewed. Because a time difference exists between the signals corresponding to the renewal of the first filter coefficients and the production of the second pseudo-echo signal, a deterioration factor is indicated in a delayed second residual signal produced from the second pseudo-echo signal, so that the double-talk state can be detected according to a difference between the first residual signal and the delayed second residual signal.

28 Claims, 11 Drawing Sheets

U.S. PATENT DOCUMENTS

| | | | | |
|---|---|---|---|---|
| 5,274,606 A | * | 12/1993 | Drumheller et al. | 340/854.4 |
| 5,283,784 A | * | 2/1994 | Genter | 379/409 |
| 5,305,309 A | * | 4/1994 | Chujo et al. | 379/411 |
| 5,636,323 A | * | 6/1997 | Umemoto et al. | 379/406 |
| 5,644,641 A | * | 7/1997 | Ikeda | 381/94.1 |
| 5,661,795 A | * | 8/1997 | Maeda | 379/412 |
| 5,696,819 A | * | 12/1997 | Suizu et al. | 379/399 |
| 5,737,409 A | * | 4/1998 | Inoue | 379/410 |
| 5,796,725 A | * | 8/1998 | Muraoka | 379/411 |
| 5,859,907 A | * | 1/1999 | Kawahara et al. | 379/410 |
| 6,061,444 A | * | 5/2000 | Kawahara et al. | 379/410 |
| 6,185,301 B1 | * | 2/2001 | Muraoka | 379/410 |
| 6,243,462 B1 | * | 6/2001 | Chujo et al. | 379/410 |
| 6,266,422 B1 | * | 7/2001 | Ikeda | 381/71.11 |

* cited by examiner

DOUBLE-TALK DETECTING APPARATUS, ECHO CANCELLER USING THE DOUBLE-TALK DETECTING APPARATUS AND ECHO SUPPRESSOR USING THE DOUBLE-TALK DETECTING APPARATUS

CROSS-REFERENCE TO THE RELATED APPLICATION

This application is a continuation of International Application No. PCT/JP00/01068, whose International filing date is Feb. 24, 2000, the disclosures of which Application are incorporated by reference herein.

BACKGROUND OF THE INVENTION

1. Field of the Invention

The present invention relates to a double-talk detecting apparatus in which a state of a double talk performed by both a near-end caller and a far-end caller through a transmission path in a two-way communication system is detected. Also, the present invention relates to an echo canceller and an echo suppressor in which an echo occurring on a near-end caller's side in the double-talk detecting apparatus is cancelled or suppressed.

2. Description of Related Art

A conventional double-talk detecting apparatus is, for example, disclosed in the Japanese Published Unexamined Patent Application No. H10-242891. In this application, an echo canceller, in which a first conventional double-talk detecting method A and a second conventional double-talk detecting method B are performed for the purpose of correctly performing the renewal of filter coefficients used in an adaptive filter, are described.

In detail, in a two-way communication system, a transmission signal is received from a near-end caller, a reception signal is received from a far-end caller, a convolution calculation using the filter coefficients is performed for the reception signal in the adaptive filter to produce a pseudo-echo signal, the pseudo-echo signal is subtracted from the transmission signal in a subtracting unit to produce a residual signal (or called an error signal), and the filter coefficients are renewed according to the residual signal. In the first conventional double-talk detecting method A, the judgment whether or not a double-talk is performed by both the near-end caller and the far-end caller is performed by using three equations (1) to (3) using a root-mean-square level (or an average amplitude level, and called a level hereinafter) S of the transmission signal, a level X of the reception signal and a level E of the residual signal.

$$X < p1 \tag{1}$$

$$S > p2*X \text{ (here, } p2 \leq 0.5 \text{)} \tag{2}$$

$$E > p3*S \tag{3}$$

Here, each of the coefficients P1, p2 and p3 is a constant. Values of the constants P1, p2 and p3 are determined according to environmental conditions of the double-talk detecting apparatus.

The judgment of the double-talk is performed according to three conditions.

First Condition: the equation (1) is satisfied.

Second Condition: the equation (1) is not satisfied, but the equation (2) is satisfied.

Third Condition: neither the equation (1) nor the equation (2) is satisfied, but the equation (3) is satisfied.

In cases where the first condition is satisfied, a voiceless state of the reception signal is detected, so that a single-talk state is judged. In cases where the second or third condition is satisfied, it is judged that the near-end and far-end callers are in a double-talk state.

In the second conventional double-talk detecting method B, the judgment whether or not a double-talk is performed is performed by using two equations (4) to (5).

$$Sj/Ej < C2*SM/EM \text{ (}C2=\frac{1}{2}\text{)} \tag{4}$$

$$Sj/Ej < C1*SM/EM \text{ (}C1=\frac{1}{4}\text{)} \tag{5}$$

Here, the symbol SM denotes a level of the transmission signal obtained when the filter coefficients of the adaptive filter are sufficiently converged in a single-talk state in which only the voice of the far-end caller is present (that is, the near-end caller is not speaking), the symbol EM denotes a level of the residual signal at the determination time of the level SM, the symbol Sj denotes a current level of the transmission signal, and the symbol Ej denotes a current level of the residual signal. In cases where the equation (4) or the equation (5) is satisfied, it is judged that the near-end and far-end callers are in a double-talk state at the current time.

Also, in the Application No. H10-242891, a first conventional echo canceller and a second and conventional echo canceller are disclosed. In the first conventional echo canceller, the renewal operation for the filter coefficients of the adaptive filter is stopped in cases where the first condition, the second condition or the third condition is satisfied according to the first conventional double-talk detecting method A. Also, in the second conventional echo canceller, the renewal operation for the filter coefficients of the adaptive filter is stopped in cases where the equation (4) or the equation (5) is satisfied according to the second conventional double-talk detecting method B.

Also, a conventional echo suppressor is, for example, disclosed in the International Telecommunication Union (ITU)-T Recommendation G.164. This echo suppressor is composed of a transmission path loss unit, a receiving line loss unit and a double-talk detecting unit. A line loss in the transmission path loss unit and a line loss in the receiving line loss unit are determined according to a detecting result obtained in the double-talk detecting unit.

Also, another conventional double-talk detecting method is disclosed in FIG. 6/G.164 and FIG. 10/G.164 of the ITU-T Recommendation G.164. In this method, a double-talk is detected by using only two inputs of a reception signal and a transmission signal. Therefore, the accuracy of the detection in this method is inferior to those of the first conventional double-talk detecting method A and the second conventional double-talk detecting method B.

There are two types of state transitions for which the detection of a double-talk state is required.

In a first state transition, a single-talk state, in which only the voice of the far-end caller is present, is changed to a double-talk state in which a voice of the near-end caller is added to the voice of the far-end caller.

In a second state transition, a single-talk state, in which a voice of the near-end caller only exists, is changed to a double-talk state in which a voice of the far-end caller is added to the voice of the near-end caller.

A double-talk state in the case of the second state transition can be detected according to any conventional double-talk detecting method. The reason is that a double-talk state can be detected by judging that a voiceless state of the reception signal is changed to a voiced state when a single-talk state based on the existence of a near-end caller's voice is changed to a double-talk state. For example, the double-talk state is detected in the first conventional double-talk detecting method A when the second condition is satisfied.

However, the detection of the double-talk state in the case of the first state transition is difficult as compared with that in the case of the second state transition. The reason is that it is required to detect the existence of a near-end caller's voice, on which an echo signal derived from a reception signal is superposed in a transmission signal, when a single-talk state based on the existence of a far-end caller's voice is changed to a double-talk state.

Various drawbacks in the detection of the double-talk state in the case of the first state transition are described hereinafter.

Drawbacks in the first conventional double-talk detecting method A are as follows.

(First Drawback) It is required to determine values of the coefficients P2 and P3 used in the equations (2) and (3) in advance according to the environmental conditions. Therefore, the use of the first conventional double-talk detecting method A is limited to a two-way communication system matching with the environmental conditions corresponding to the constants P2 and P3.

(Second Drawback) In cases where a double-talk state is detected because the third condition is satisfied, a ratio of a residual signal level E to a transmission signal level S becomes a value higher than the constant value P3. In this condition of the echo canceller disclosed in the Application No. H10-242891, the filter coefficients of the adaptive filter considerably deteriorate as compared with ideal filter coefficients used to perform an impulse response which is almost the same as an actual impulse response of an echo path through which an echo signal of the reception signal is superposed on a near-end caller's voice. The pseudo-echo signal which are derived from the reception signal according to a convolution calculation of an impulse response using the deteriorating filter coefficients have an excessive factor corresponding to the deterioration of the filter coefficients as compared with an ideal pseudo-echo signal corresponding to the ideal filter coefficients. As a result, a ratio of the residual signal level E, which is obtained after the subtraction of the subtracting circuit, to the level S of the transmission signal, which is input to the subtracting circuit as an adding factor, becomes a value higher than the constant value P3. Therefore, in this double-talk detecting method A, because the double-talk state is detected when the filter coefficients have considerably deteriorated after a considerable passage of time from the occurrence of the double-talk state, the detection of the double-talk state is necessarily delayed. Therefore, this long detection delay causes various troubles in the first conventional double-talk detecting method A.

Also, a drawback in the second conventional double-talk detecting method B is as follows.

(First Drawback) The levels SM and EM denote average levels of the transmission signal and the residual signal obtained after the filter coefficients are sufficiently converged. Therefore, it is required to judge whether or not the filter coefficients are sufficiently converged. Also, the judgment mainly depends on the detection of the double-talk state. Accordingly, there is a high possibility that the double-talk state is erroneously detected in cases where the judgment of the sufficient conversion for the filter coefficients is performed to detect the double-talk state.

SUMMARY OF THE INVENTION

An object of the present invention is to provide, with due consideration to the drawbacks of the conventional double-talk detecting apparatus, a double-talk detecting apparatus in which a double-talk state is detected while lessening a detection delay and without depending on any environmental conditions on condition that it is not required to judge whether or not filter coefficients are sufficiently converged. Also, a subordinate object of the present invention is to provide an echo canceller, using the double-talk detecting apparatus, in which an echo of a far-end caller's voice is cancelled in order to transmit a near-end caller's voice at a high speech quality while suppressing the deterioration of filter coefficients of an adaptive filter to a minimum. Also, another subordinate object of the present invention is to provide an echo suppressor, using the double-talk detecting apparatus, in which an echo of a far-end caller's voice is suppressed in a double-talk state while reducing the interruption (or chopping) of a conversation between the far-end caller and a near-end caller.

The object of the present invention is achieved by the provision of a double-talk detecting apparatus, comprising:

first adaptive filtering means for renewing first filter coefficients according to both a first residual signal, which is obtained from a transmission signal, indicates an echo component derived from a reception signal in the single-talk state and indicates the superposition of the echo component and a voice of a first caller in the double-talk state, and a first pseudo-echo signal, which approximates the echo component, and producing the first pseudo-echo signal from the reception signal according to the first filter coefficients renewed, the first filter coefficients deteriorating in the double-talk state;

non-adaptive filtering means for producing a second pseudo-echo signal, in which a deterioration factor indicating the deterioration of the first filter coefficients renewed is included in the double-talk state, from the reception signal according to the first filter coefficients which are renewed by the first adaptive filtering means according to the first residual signal;

delaying means for delaying, by a prescribed time-period, the reception signal which corresponds to a past time prior to a current time by the prescribed time-period and is input to the first adaptive filtering means, the reception signal which corresponds to the past time and is input to the non-adaptive filtering means or the transmission of the first filter coefficients renewed by the first adaptive filtering means at the past time to the non-adaptive filtering means to make the first adaptive filtering means produce the first pseudo-echo signal corresponding to the past time, to make the non-adaptive filtering means produce the second pseudo-echo signal corresponding to the past time or to produce the first filter coefficients corresponding to the past time;

first subtracting means for subtracting the first pseudo-echo signal produced by the first adaptive filtering means from the transmission signal corresponding to the current or past time, which is the same as that of the first pseudo-echo signal, to produce the first residual signal, which does not have the echo component included in the transmission signal in the single-talk state, and transmitting the first residual signal to the first adaptive filtering means;

second subtracting means for subtracting the second pseudo-echo signal produced by the non-adaptive filtering means from the transmission signal corresponding to the current or past time, which is the same as that of the second pseudo-echo signal, to produce a second residual signal which indicates the deterioration factor in the double-talk state and approximates the first residual signal in the single-talk state; and detecting means for detecting the double-talk state according to a difference between the second residual signal produced by the second subtracting means and the first residual signal produced by the first subtracting means.

In the above configuration, a first pseudo-echo signal is produced from a reception signal by the first adaptive filtering means, and a second pseudo-echo signal is produced from a reception signal by the non-adaptive filtering means according to the renewed first filter coefficients transmitted from the first adaptive filtering means. Thereafter, a first residual signal is produced from the first pseudo-echo signal and a transmission signal by the first subtracting means, a second residual signal is produced from the second pseudo-echo signal and a transmission signal by the second subtracting means, and the double-talk state is detected by the detecting means according to the first residual signal and the second residual signal. In this case, the first pseudo-echo signal or the second pseudo-echo signal is produced from the reception signal corresponding to the past time, or the second pseudo-echo signal is produced according to the renewed first filter coefficients corresponding to the past time. Therefore, a deterioration factor indicating the deterioration of the first filter coefficients renewed is included in the second pseudo-echo signal in the double-talk state.

Accordingly, the transition from the single-talk state to the double-talk state can be detected while lessening a detection delay and without depending on any environmental conditions on condition that it is not required to judge whether or not the first filter coefficients are sufficiently converged.

It is preferred that the delaying means comprises:

first delaying means for receiving the reception signal corresponding to the past time and delaying the reception signal by the prescribed time-period to produce a delayed reception signal, the first pseudo-echo signal being produced from the delayed reception signal by the first adaptive filtering means; and second delaying means for receiving the transmission signal corresponding to the past time from the first caller and delaying the transmission signal by the prescribed time-period to produce a delayed transmission signal, the first pseudo-echo signal being subtracted from the delayed transmission signal by the first subtracting means, the second pseudo-echo signal is produced from the reception signal corresponding to the current time by the non-adaptive filtering means, the second pseudo-echo signal is subtracted from the transmission signal corresponding to the current time by the second subtracting means, the first filter coefficients renewed by the first adaptive filtering means at the current time are transmitted to the non-adaptive filtering means, and the double-talk detecting apparatus further comprises third delaying means for delaying the second residual signal produced by the second subtracting means by the prescribed time-period to produce a delayed second residual signal, the double-talk state being detected according to the difference between the delayed second residual signal and the first residual signal.

In the above configuration, in cases where a talk state is in the single-talk state, because no voice of the first caller (for example, a near-end caller) exists in the transmission signal, the first filter coefficients are correctly renewed by the first adaptive filtering means to make the first pseudo-echo signal approximate the echo component, so that the first residual signal is minimized. Also, because the first filter coefficients are correctly renewed, the second pseudo-echo signal produced by the non-adaptive filtering means according to the first filter coefficients renewed approximates the echo component. Therefore, the delayed second residual signal produced from the second pseudo-echo signal becomes almost the same as the first residual signal. Therefore, the difference between the delayed second residual signal and the first residual signal is small. Therefore, no double-talk signal is detected by the detecting means.

In contrast, in cases where the talk state is changed from the single-talk state to the double-talk state, because a voice of the first caller exists with the echo component in the transmission signal, the first filter coefficients are not correctly renewed by the first adaptive filtering means, so that the first filter coefficients renewed deteriorate. In this case, though the first filter coefficients are renewed to reduce the first residual signal regardless of whether or not the first pseudo-echo signal produced by the first adaptive filtering means approximates the echo component, a deterioration factor is included in the second pseudo-echo signal produced by the non-adaptive filtering means because of a time difference between the first residual signal used to renew the first filter coefficients and the reception signal processed by the non-adaptive filtering means. Therefore, the deterioration factor is indicated by the delayed second residual signal, so that the difference between the delayed second residual signal and the first residual signal becomes large. As a result, the double-talk signal is immediately detected by the detecting means according to the difference.

Accordingly, because a deterioration degree of the first filter coefficients is estimated according to a difference between the delayed second residual signal and the first residual signal, it is not required to judge whether or not the first filter coefficients are sufficiently converged, and the double-talk state can be reliably detected while lessening a detection delay and without depending on any environmental conditions.

It is also preferred that the delaying means comprises:

first delaying means for receiving the reception signal corresponding to the past time and delaying the reception signal by the prescribed time-period to produce a delayed reception signal corresponding to the past time, the second pseudo-echo signal being produced from the delayed reception signal by the non-adaptive filtering means; and second delaying means for receiving the transmission signal corresponding to the past time from the first caller and delaying the transmission signal by the prescribed time-period to produce a delayed transmission signal, the second pseudo-echo signal being subtracted from the delayed transmission signal by the second subtracting means, the first pseudo-echo signal is produced from the reception signal corresponding to the current time by the first adaptive filtering means, the first pseudo-echo signal is subtracted from the transmission signal corresponding to the current time by the first subtracting means, the first filter coefficients renewed by the first adaptive filtering means at the current time are transmitted to the non-adaptive filtering means, and the double-talk detecting apparatus further comprises third delaying means for delaying the first residual signal produced by the first subtracting means by the prescribed time-period to produce a delayed first residual signal, the double-talk state being detected according to the difference between the second residual signal and the delayed first residual signal.

In the above configuration, because the first filter coefficients renewed by the first adaptive filtering means deteriorate in the double-talk state and because a time difference between the first residual signal used to renew the first filter coefficients and the delayed reception signal processed by the non-adaptive filtering means occurs, a deterioration factor is included in the second pseudo-echo signal, so that a difference between the second residual signal and the delayed first residual signal becomes large in the double-talk state. Therefore, the double-talk state can be immediately detected by the detecting means.

Accordingly, because a deterioration degree of the first filter coefficients is estimated according to a difference between the second residual signal and the delayed first residual signal, it is not required to judge whether or not the first filter coefficients are sufficiently converged, and the double-talk state can be reliably detected while lessening a detection delay and without depending on any environmental conditions.

It is also preferred that the delaying means comprises:

filter coefficient storing means for storing a group of the first filter coefficients renewed by the first adaptive filtering means each time the group of the first filter coefficients is renewed by the first adaptive filtering means and outputting the group of the first filter coefficients corresponding to the past time to the non-adaptive filtering means, the second pseudo-echo signal being produced from the reception signal corresponding to the current time according to the first filter coefficients corresponding to the past time, the first pseudo-echo signal is produced from the reception signal corresponding to the current time by the first adaptive filtering means, the first pseudo-echo signal is subtracted from the transmission signal corresponding to the current time by the first subtracting means, and the second pseudo-echo signal is subtracted from the transmission signal corresponding to the current time by the second subtracting means.

In the above configuration, the transmission of the group of the first filter coefficients renewed by the first adaptive filtering means to the non-adaptive filtering means is substantially delayed by the filter coefficient storing means. Therefore, the second pseudo-echo signal is produced from the reception signal corresponding to the current time according to the group of the first filter coefficients corresponding to the past time, so that the transition from the single-talk state to the double-talk state is detected.

Accordingly, because a deterioration degree of the first filter coefficients is estimated according to a difference between the second residual signal and the first residual signal, it is not required to judge whether or not the first filter coefficients are sufficiently converged, and the double-talk state can be reliably detected while lessening a detection delay and without depending on any environmental conditions.

It is also preferred that the double-talk detecting apparatus further comprises:

filter coefficient transmission control means for controlling the transmission of a group of the first filter coefficients renewed by the first adaptive filtering means to the filter coefficient storing means according to a double-talk state detecting result obtained by the detecting means each time the group of the first filter coefficients is renewed by the first adaptive filtering means, the group of the first filter coefficients being stored in the filter coefficient storing means in cases where the group of the first filter coefficients is adopted by the filter coefficient transmission control means.

In the above configuration, a group of the first filter coefficients renewed by the first adaptive filtering means is, for example, suddenly changed though the single-talk state is continued. In this case, because it is assumed that the group of the first filter coefficients renewed considerably deteriorates, it is better that the group of the first filter coefficients renewed is abandoned. Also, the steady condition of the reception signal continues, for example, for a long time in the single-talk state, so that a plurality of groups of the first filter coefficients renewed by the first adaptive filtering means are almost the same as each other. In this case, it is better that the groups of the renewed first filter coefficients almost the same as each other are abandoned.

In this double-talk detecting apparatus, it is detected according to the double-talk detecting result whether or not a talk state is the single-talk state or the double-talk state. In cases where it is desired to abandon the group of the currently-renewed first filter coefficients, the group of the currently-renewed first filter coefficients is not adopted.

In contrast, in cases where the group of the currently-renewed first filter coefficients is adopted, the group of the currently-renewed first filter coefficients is stored in the filter coefficient storing means.

Accordingly, because the group of the first filter coefficients currently renewed by the first adaptive filtering means is not adopted in cases where the group of the currently-renewed first filter coefficients is not desired, a memory capacity of the filter coefficient storing means can be reduced, and the double-talk state can be stably detected.

It is also preferred that the non-adaptive filtering means comprises

N non-adaptive filtering units (N is an integer) for respectively producing a j-th pseudo-echo signal (j=2,3, . . . , N+1), in which a deterioration factor indicating the deterioration of the first filter coefficients renewed is included in the double-talk state, from the reception signal corresponding to the current time according to one group of the first filter coefficients stored in the filter coefficient storing means, the N groups of the first filter coefficients being different from each other, the second subtracting means comprises N second subtracting units, connected with the N non-adaptive filtering units in one-to-one correspondence, for respectively subtracting the j-th pseudo-echo signal produced by the corresponding non-adaptive filtering unit from the transmission signal corresponding to the current time to produce a j-th residual signal which indicates the deterioration factor in the double-talk state and approximates the first residual signal in the single-talk state, the double-talk state being detected by the detecting means according to a difference between the first residual signal and a group of one or more residual signals selected from the N residual signals.

In the above configuration, N residual signals are produced in the N second subtracting units according to the N groups of first filter coefficients different from each other, and the double-talk state is detected by the detecting means according to a difference between the first residual signal and a group of one or more residual signals selected from the N residual signals.

Accordingly, the transition to the double-talk state can be moreover reliably detected.

Also, because the number of residual signals used for the detection of the double-talk state can be adjusted according to environmental conditions, the double-talk detecting apparatus can be useful for any environmental conditions.

The object of the present invention is achieved by the provision of an echo canceller, comprising:

first adaptive filtering means for renewing first filter coefficients according to both a first residual signal, which is obtained from a transmission signal, indicates an echo component derived from a reception signal in a single-talk state and indicates the superposition of the echo component and a voice of a first caller in a double-talk state, and a first pseudo-echo signal, which approximates the echo component, and producing the first pseudo-echo signal from the reception signal according to the first filter coefficients renewed, the first filter coefficients deteriorating in the double-talk state;

non-adaptive filtering means for producing a second pseudo-echo signal, in which a deterioration factor indicating the deterioration of the first filter coefficients renewed is included in the double-talk state, from the reception signal according to the first filter coefficients which are renewed by the first adaptive filtering means according to the first residual signal;

delaying means for delaying, by a prescribed time-period, the reception signal which corresponds to a past time prior to a current time by the prescribed time-period and is input to the first adaptive filtering means, the reception signal which corresponds to the past time and is input to the non-adaptive filtering means or the transmission of the first filter coefficients renewed by the first adaptive filtering means at the past time to the non-adaptive filtering means to make the first adaptive filtering means produce the first pseudo-echo signal, corresponding to the past time, to make the non-adaptive filtering means produce the second pseudo-echo signal corresponding to the past time or to produce the first filter coefficients corresponding to the past time;

first subtracting means for subtracting the first pseudo-echo signal produced by the first adaptive filtering means from the transmission signal corresponding to the current or past time, which is the same as that of the first pseudo-echo signal, to produce the first residual signal which does not have the echo component included in the transmission signal in the single-talk state and transmitting the first residual signal to the first adaptive filtering means;

second subtracting means for subtracting the second pseudo-echo signal produced by the non-adaptive filtering means from the transmission signal corresponding to the current or past time, which is the same as that of the second pseudo-echo signal, to produce a second residual signal which indicates the deterioration factor in the double-talk state and approximates the first residual signal in the single-talk state;

detecting means for detecting the double-talk state or the single-talk state according to a difference between the second residual signal produced by the second subtracting means and the first residual signal produced by the first subtracting means and outputting a talk state detecting signal indicating the detection of the double-talk state or the detection of the single-talk state;

second adaptive filtering means for renewing second filter coefficients according to, an echo cancelled transmission signal obtained from the transmission signal of the current time and a third pseudo-echo signal approximating the echo component, in cases where the talk state detecting signal indicating the detection of the single-talk state is received from the detecting means, and producing the third pseudo-echo signal corresponding to the current time from the reception signal of the current time according to the second filter coefficients; and third subtracting means for subtracting the third pseudo-echo signal produced by the second adaptive filtering means from the transmission signal of the current time to produce the echo cancelled transmission signal, in which the echo component included in the transmission signal is removed, sending the echo cancelled transmission signal to the second adaptive filtering means to make the second adaptive filtering means renew the second filter coefficients and outputting the echo cancelled transmission signal.

In the above configuration of the echo canceller, in cases where the detecting means informs the second adaptive filtering means of the single-talk state, the second filter coefficients are renewed, and the echo cancelled transmission signal are output. In contrast, in cases where the detecting means informs the second adaptive filtering means of the double-talk state, no second filter coefficients are renewed, but the echo cancelled transmission signal produced by using the second filter coefficients renewed in the single-talk state are output. Assuming that the second filter coefficients are renewed in the double-talk state, the second filter coefficients deteriorate in the same manner as the first filter coefficients. Therefore, there is no probability that the second filter coefficients deteriorates in the renewal operation in the double-talk state.

Accordingly, the deterioration of the second filter coefficients can be suppressed to a minimum, and the voice of the first caller can be transmitted at a high speech quality even in the double-talk state.

Also, because a deterioration degree of the first filter coefficients is estimated according to a difference between the second residual signal and the first residual signal, it is not required to judge whether or not the first filter coefficients are sufficiently converged, and the double-talk state can be reliably detected while lessening a detection delay and without depending on any environmental conditions.

It is preferred that the delaying means comprises:

first delaying means for receiving the reception signal corresponding to the past time and delaying the reception signal by the prescribed time-period to produce a delayed reception signal, the first pseudo-echo signal being produced from the delayed reception signal by the first adaptive filtering means; and second delaying means for receiving the transmission signal corresponds to the past time from the first caller and delaying the transmission signal by the prescribed time-period to produce a delayed transmission signal, the first pseudo-echo signal being subtracted from the delayed transmission signal by the first subtracting means, the second pseudo-echo signal is produced from the reception signal corresponding to the current time by the non-adaptive filtering means, the second pseudo-echo signal is subtracted from the transmission signal corresponding to the current time by the second subtracting means, the first filter coefficients renewed by the first adaptive filtering means at the current time are transmitted to the non-adaptive filtering means, and the echo canceller further comprises third delaying means for delaying the second residual signal produced by the second subtracting means by the prescribed time-period to produce a delayed second residual signal, the double-talk state being detected according to the difference between the delayed second residual signal and the first residual signal.

In the above configuration, the first residual signal is produced from the transmission signal corresponding to the past time and the reception signal corresponding to the past time, the first filter coefficients are renewed according to the first residual signal corresponding to the past time, and the second pseudo-echo signal is produced from the reception signal corresponding to the current time according to the first filter coefficients corresponding to the past time.

Accordingly, the transition from the single-talk state to the double-talk state can be reliably detected.

It is preferred that the delaying means comprises:

first delaying means for receiving the reception signal corresponding to the past time and delaying the reception signal by the prescribed time-period to produce a delayed reception signal corresponding to the past time, the second pseudo-echo signal being produced from the delayed reception signal by the non-adaptive filtering means; and second delaying means for receiving the transmission signal corresponds to the past time from the first caller and delaying the transmission signal by the prescribed time-period to produce a delayed transmission signal, the second- pseudo-echo signal being subtracted from the delayed transmission signal by the second subtracting means, the first pseudo-echo signal is produced from the reception signal corresponding to the current time by the first adaptive filtering means, the first pseudo-echo signal is subtracted from the transmission signal corresponding to the current time by the first subtracting means, the first filter coefficients renewed by the first adaptive filtering means at the current time are transmitted to the non-adaptive filtering means, and the echo canceller further comprises third delaying means for delaying the first residual signal produced by the first subtracting means by the prescribed time-period to produce a delayed first residual. signal, the double-talk state being detected according to the difference between the second residual signal and the delayed first residual signal.

In the above configuration, the first residual signal is produced from the transmission signal corresponding to the current time and the reception signal corresponding to the current time, the first filter coefficients are renewed according to the first residual signal corresponding to the current time, and the second pseudo-echo signal is produced from the reception signal corresponding to the past time according to the first filter coefficients corresponding to the current time.

Accordingly, the transition from the single-talk state to the double-talk state can be reliably detected.

It is preferred that the delaying means comprises:

filter coefficient storing means for storing a group of the first filter coefficients renewed by the first adaptive filtering means each time the group of the first filter coefficients is renewed by the first adaptive filtering means and outputting the group of the first filter coefficients corresponding to the past time to the non-adaptive filtering means, the second pseudo-echo signal being produced from the reception signal corresponding to the current time according to the first filter coefficients corresponding to the past time, the first pseudo-echo signal is produced from the reception signal corresponding to the current time by the first adaptive filtering means, the first pseudo-echo signal is subtracted from the transmission signal corresponding to the current time by the first subtracting means, and the second pseudo-echo signal is subtracted from the transmission signal corresponding to the current time by the second subtracting means.

In the above configuration, the transmission of the group of the first filter coefficients renewed by the first adaptive filtering means to the non-adaptive filtering means is substantially delayed by the filter coefficient storing means. Therefore, the second pseudo-echo signal is produced from the reception signal corresponding to the current time according to the group of the first filter coefficients corresponding to the past time.

Accordingly, the transition from the single-talk state to the double-talk state can be reliably detected.

It is preferred that the echo canceller further comprises:

filter coefficient transmission control means for controlling the transmission of a group of the first filter coefficients renewed by the first adaptive filtering means to the filter coefficient storing means according to the talk state detecting signal output from the detecting means each time the group of the first filter coefficients is renewed by the first adaptive filtering means, the group of the first filter coefficients being stored in the filter coefficient storing means in cases where the group of the first filter coefficients is adopted by the filter coefficient transmission control means.

In the above configuration, in cases where it is judged according to the talk state detecting signal that it is desired to abandon the group of the currently-renewed first filter coefficients, the group of the currently-renewed first filter coefficients is not adopted. In contrast, in cases where the group of the currently-renewed first filter coefficients is adopted, the group of the currently-renewed first filter coefficients is stored in the filter coefficient storing means.

Accordingly, because the group of the first filter coefficients currently renewed by the first adaptive filtering means is not adopted in cases where the group of the currently-renewed first filter coefficients is not desired, a memory capacity of the filter coefficient storing means can be reduced, and the double-talk state can be stably detected.

It is also preferred that the non-adaptive filtering means comprises

N non-adaptive filtering units (N is an integer) for respectively producing a j-th pseudo-echo signal (j=2,3, ... , N+1), in which a deterioration factor indicating the deterioration of the first filter coefficients renewed is included in the double-talk state, from the reception signal corresponding to the current time according to one group of the first filter coefficients stored in the filter coefficient storing means, the N groups of the first filter coefficients being different from each other, the second subtracting means comprises N second subtracting units, connected with the N non-adaptive filtering units in one-to-one correspondence, for respectively subtracting the j-th pseudo-echo signal produced by the corresponding non-adaptive filtering unit from the transmission signal corresponding to the current time to produce a j-th residual signal which indicates the deterioration factor in the double-talk state and approximates the first residual signal in the single-talk state, the double-talk state being detected by the detecting means according to a difference between the first residual signal and a group of one or more residual signals selected from the N residual signals.

In the above configuration, N residual signals are produced in the N second subtracting units according to the N groups of first filter coefficients different from each other, and the double-talk state is detected by the detecting means according to a difference between the first residual signal and a group of one or more residual signals selected from the N residual signals.

Accordingly, the transition to the double-talk state can be moreover reliably detected.

Also, because the number of residual signals used for the detection of the double-talk state can be adjusted according to environmental conditions, the echo canceller can be useful for any environmental conditions.

The object of the present invention is also achieved by the provision of an echo canceller, comprising:

first adaptive filtering means for renewing first filter coefficients according to an echo cancelled transmission signal, which is obtained from a transmission signal, indicates an echo component derived from a reception signal in a single-talk state and indicates the superposition of the echo component and a voice of a first caller in a double-talk state, and a first pseudo-echo signal, which approximates the echo component, in cases where a talk state detecting signal indicating the detection of the single-talk state is received, and producing the first pseudo-echo signal from the reception signal according to the first filter coefficients renewed, the first filter coefficients deteriorating in the double-talk state;

non-adaptive filtering means for producing a second pseudo-echo signal, in which a deterioration factor indicating the deterioration of the first filter coefficients renewed is included in the double-talk state, from the reception signal according to the first filter coefficients which are renewed by the first adaptive filtering means according to the echo cancelled transmission signal;

delaying means for delaying, by a prescribed time-period, the reception signal which corresponds to a past time prior to a current time by the prescribed time-period and is input to the first adaptive filtering means, the reception signal which corresponds to the past time and is input to the non-adaptive filtering means or the transmission of the first filter coefficients, which are renewed by the first adaptive filtering means at the past time, to the non-adaptive filtering means to make the first adaptive filtering means produce the first pseudo-echo signal corresponding to the past time, to make the non-adaptive filtering means produce the second pseudo-echo signal corresponding to the past time or to produce the first filter coefficients corresponding to the past time;

first subtracting means for subtracting the first pseudo-echo signal produced by the first adaptive filtering means from the transmission signal corresponding to the current or past time, which is the same as that of the first pseudo-echo signal, to produce the echo cancelled transmission signal, which does not have the echo component included in the transmission signal in the single-talk state, and transmitting the echo cancelled transmission signal to the first adaptive filtering means;

second subtracting means for subtracting the second pseudo-echo signal produced by the non-adaptive filtering means from the transmission signal corresponding to the current or past time, which is the same as that of the second pseudo-echo signal, to produce a first residual signal which indicates the deterioration factor in the double-talk state and approximates the echo cancelled transmission signal in the single-talk state; and detecting means for detecting the double-talk state or the single-talk state according to a difference between the first residual signal produced by the second subtracting means and the echo cancelled transmission signal produced by the first subtracting means and outputting a talk state detecting signal indicating the detection of the double-talk state or the talk state detecting signal indicating the detection of the single-talk state to the first adaptive filtering means.

In the above configuration of the echo canceller, the double-talk state or the single-talk state is detected by the detecting means in the same manner as in the double-talk detecting apparatus, and the talk state detecting signal indicating the detection of the single-talk state is sent to the first adaptive filtering means. In the first adaptive filtering means, no first filter coefficients are renewed in the double-talk, but the first filter coefficients are renewed in the single-talk state according to the talk state detecting signal. Therefore, no first filter coefficients deteriorate in the renewal operation, but the first filter coefficients deteriorate a little bit in the double-talk state because no renewal of the first filter coefficients is performed in the double-talk state. As a result, the double-talk state or the single-talk state can be detected by the detecting means in the same manner as in the double-talk detecting apparatus.

Accordingly, the deterioration of the first filter coefficients can be suppressed to a minimum. Therefore, the voice of the first caller can be transmitted at a high speech quality even in the double-talk state.

Also, because the double-talk state in the first state transition is detected in the same manner as in the double-talk detecting apparatus, it is not required to judge whether or not the first filter coefficients are sufficiently converged, and the double-talk state can be reliably detected while lessening a detection delay and without depending on any environmental conditions.

Also, because neither second adaptive filtering means nor the third subtracting means is not required, the echo canceller, in which a date processing volume and a memory capacity are reduced, can be obtained as compared with the above-described echo cancellers.

It is preferred that the delaying means comprises:

first delaying means for receiving the reception signal corresponding to the past time and delaying the reception signal by the prescribed time-period to produce a delayed reception signal, the first pseudo-echo signal being produced from the delayed reception signal by the first adaptive filtering means; and second delaying means for receiving the transmission signal corresponds to the past time from the first caller and delaying the transmission signal by the prescribed time-period to produce a delayed transmission signal, the first pseudo-echo signal being subtracted from the delayed transmission signal by the first subtracting means, the second pseudo-echo signal is produced from the reception signal corresponding to the current time by the non-adaptive filtering means,
the second pseudo-echo signal is subtracted from the transmission signal corresponding to the current time by the second subtracting means,
the first filter coefficients renewed by the first adaptive filtering means at the current time are transmitted to the non-adaptive filtering means, and
the echo canceller further comprises
  third delaying means for delaying the first residual signal produced by the second subtracting means by the prescribed time-period to produce a delayed first residual signal, the double-talk state being detected according to the difference between the delayed first residual signal and the echo cancelled transmission signal.

In the above configuration, the first residual signal is produced from the transmission signal corresponding to the past time and the reception signal corresponding to the past time, the first filter coefficients are renewed according to the first residual signal corresponding to the past time, and the second pseudo-echo signal is produced from the reception signal corresponding to the current time according to the first filter coefficients corresponding to the past time.

Accordingly, the transition from the single-talk state to the double-talk state can be reliably detected.

It is preferred that the delaying means comprises:
  first delaying means for receiving the reception signal corresponding to the past time and delaying the reception signal by the prescribed time-period to produce a delayed reception signal corresponding to the past time, the second pseudo-echo signal being produced from the delayed reception signal by the non-adaptive filtering means; and
  second delaying means for receiving the transmission signal corresponds to the past time from the first caller and delaying the transmission signal by the prescribed time-period to produce a delayed transmission signal, the second pseudo-echo signal being subtracted from the delayed transmission signal by the second subtracting means,
the first pseudo-echo signal is produced from the reception signal corresponding to the current time by the first adaptive filtering means,
the first pseudo-echo signal is subtracted from the transmission signal corresponding to the current time by the first subtracting means,
the first filter coefficients renewed by the first adaptive filtering means at the current time are transmitted to the non-adaptive filtering means, and
the echo canceller further comprises
  third delaying means for delaying the echo cancelled transmission signal produced by the first subtracting means by the prescribed time-period to produce a delayed second residual signal, the double-talk state being detected according to the difference between the first residual signal and the delayed second residual signal.

In the above configuration, the first residual signal is produced from the transmission signal corresponding to the current time and the reception signal corresponding to the current time, the first filter coefficients are renewed according to the first residual signal corresponding to the current time, and the second pseudo-echo signal is produced from the reception signal corresponding to the past time according to the first filter coefficients corresponding to the current time.

Accordingly, the transition from the single-talk state to the double-talk state can be reliably detected.

It is preferred that the delaying means comprises
  filter coefficient storing means for storing a group of the first filter coefficients renewed by the first adaptive filtering means each time the group of the first filter coefficients is renewed by the first adaptive filtering means and outputting the group of the first filter coefficients corresponding to the past time to the non-adaptive filtering means, the second pseudo-echo signal being produced from the reception signal corresponding to the current time according to the first filter coefficients corresponding to the past time,
the first pseudo-echo signal is produced from the reception signal corresponding to the current time by the first adaptive filtering means,
the first pseudo-echo signal is subtracted from the transmission signal corresponding to the current time by the first subtracting means, and
the second pseudo-echo signal is subtracted from the transmission signal corresponding to the current time by the second subtracting means.

In the above configuration, the transmission of the group of the first filter coefficients renewed by the first adaptive filtering means to the non-adaptive filtering means is substantially delayed by the filter coefficient storing means. Therefore, the second pseudo-echo signal is produced from the reception signal corresponding to the current time according to the group of the first filter coefficients corresponding to the past time.

Accordingly, the transition from the single-talk state to the double-talk state can be reliably detected.

It is also preferred that the echo canceller further comprises:
  filter coefficient transmission control means for controlling the transmission of a group of the first filter coefficients renewed by the first adaptive filtering means to the filter coefficient storing means according to the talk state detecting signal output from the detecting means each time the group of the first filter coefficients is renewed by the first adaptive filtering means, the group of the first filter coefficients being stored in the filter coefficient storing means in cases where the group of the first filter coefficients is adopted by the filter coefficient transmission control means.

In the above configuration, in cases where it is judged according to the talk state detecting signal that it is desired to abandon the group of the currently-renewed first filter coefficients, the group of the currently-renewed first filter coefficients is not adopted. In contrast, in cases where the group of the currently-renewed first filter coefficients is adopted, the group of the currently-renewed first filter coefficients is stored in the filter coefficient storing means.

Accordingly, because the group of the first filter coefficients currently renewed by the first adaptive filtering means is not adopted in cases where the group of the currently-renewed first filter coefficients is not desired, a memory capacity of the filter coefficient storing means can be reduced, and the double-talk state can be stably detected.

It is also preferred that the non-adaptive filtering means comprises
  N non-adaptive filtering units (N is an integer) for respectively producing a j-th pseudo-echo signal (j=2,3, . . . , N+1), in which a deterioration factor indicating the deterioration of the first filter coefficients renewed is included in the double-talk state, from the reception signal corresponding to the current time according to one group of the first filter coefficients stored in the filter coefficient storing means, the N groups of the first filter coefficients being different from each other, the second subtracting means comprises N second subtracting units, connected with the N non-adaptive filtering units in one-to-one correspondence, for respectively subtracting the j-th pseudo-echo signal produced by the corresponding non-adaptive filtering unit from the transmission signal corresponding to the current time to produce a j-th residual signal which indicates the deterioration factor in the double-talk state and approximates the echo cancelled transmission signal in the single-talk state, the double-talk state being detected by the detecting means according to a difference between the echo cancelled transmission signal and a group of one or more residual signals selected from the N residual signals.

In the above configuration, N residual signals are produced in the N second subtracting units according to the N groups of first filter coefficients different from each other, and the double-talk state is detected by the detecting means according to a difference between the first residual signal and a group of one or more residual signals selected from the N residual signals.

Accordingly, the transition to the double-talk state can be moreover reliably detected.

Also, because the number of residual signals used for the detection of the double-talk state can be adjusted according to environmental conditions, the echo canceller can be useful for any environmental conditions.

The object of the present invention is achieved by the provision of an echo suppressor, comprising:

first adaptive filtering means for renewing first filter coefficients according to both a first residual signal, which is obtained from a transmission signal, indicates an echo component derived from a reception signal in a single-talk state and indicates the superposition of the echo component and a voice of a first caller in a double-talk state, and a first pseudo-echo signal, which approximates the echo component, and producing the first pseudo-echo signal from the reception signal according to the first filter coefficients renewed, the first filter coefficients deteriorating in the double-talk state;

non-adaptive filtering means for producing a second pseudo-echo signal, in which a deterioration factor indicating the deterioration of the first filter coefficients renewed is included in the double-talk state, from the reception signal according to the first filter coefficients which are renewed by the first adaptive filtering means according to the first residual signal;

delaying means for delaying, by a prescribed time-period, the reception signal which corresponds to a past time prior to a current time by the prescribed time-period and is input to the first adaptive filtering means, the reception signal which corresponds to the past time and is input to the non-adaptive filtering means or the transmission of the first filter coefficients, which are renewed by the first adaptive filtering means at the past time, to the non-adaptive filtering means to make the first adaptive filtering means produce the first pseudo-echo signal corresponding to the past time, to make the non-adaptive filtering means produce the second pseudo-echo signal corresponding to the past time or to produce the first filter coefficients corresponding to the past time;

first subtracting means for subtracting the first pseudo-echo signal produced by the first adaptive filtering means from the transmission signal corresponding to the current or past time, which is the same as that of the first pseudo-echo signal, to produce the first residual signal, which does not have the echo component included in the transmission signal in the single-talk state, and transmitting the first residual signal to the first adaptive filtering means;

second subtracting means for subtracting the second pseudo-echo signal produced by the non-adaptive filtering means from the transmission signal corresponding to the current or past time, which is the same as that of the second pseudo-echo signal, to produce a second residual signal which indicates the deterioration factor in the double-talk state and approximates the first residual signal in the single-talk state;

detecting means for detecting the double-talk state or the single-talk state according to a difference between the second residual signal produced by the second subtracting means and the first residual signal produced by the first subtracting means and outputting a talk state detecting signal indicating the detection of the double-talk state or the detection of the single-talk state;

attenuation control, means for receiving the talk state detecting signal from the detecting means, generating a transmission attenuation control signal indicating an attenuation degree of the transmission signal currently received according to the talk state detecting signal, and generating a reception attenuation control signal indicating an attenuation degree of the reception signal currently received according to the talk state detecting signal;

first attenuating means for attenuating the transmission signal currently received according to the transmission attenuation control signal generated by the attenuation control means to produce an attenuated transmission signal and outputting the attenuated transmission signal; and second attenuating means for attenuating the reception signal currently received according to the reception attenuation control signal generated by the attenuation control means to produce an attenuated reception signal and outputting the attenuated reception signal.

In the above configuration of the echo suppressor, when the single-talk state based on a second caller's voice existing in the reception signal is changed to the double-talk state because a voice of the first caller is added to the transmission signal, the double-talk state is detected by the detecting means, and the reception signal is attenuated according to the reception attenuation control signal. Therefore, an echo component superposed on a voice of the first caller can be suppressed. Also, in this case, an attenuation degree of the transmission signaling the double-talk state is reduced as compared with that in the single-talk state.

Accordingly, because the attenuation degrees of the transmission signal and the reception signal are adjusted according to the attenuation control signals, an echo of a second caller's voice can be suppressed in the double-talk state while reducing the interruption (or chopping) of a conversation, and the conversation can be performed at a high speech quality.

Also, because the double-talk state in the first state transition is detected in the same manner as in the double-talk detecting apparatus, it is not required to judge whether or not the first filter coefficients are sufficiently converged, and the double-talk state can be reliably detected in the first state transition while lessening a detection delay and without depending on any environmental conditions.

It is preferred that the delaying means comprises:

first delaying means for receiving the reception signal corresponding to the past time and delaying the reception signal by the prescribed time-period to produce a delayed reception signal, the first pseudo-echo signal being produced from the delayed reception signal by the first adaptive filtering means; and second delaying means for receiving the transmission signal corresponding to the past time from the first caller and delaying the transmission signal by the prescribed time-period to produce a delayed transmission signal, the first pseudo-echo signal being subtracted from the delayed transmission signal by the first subtracting means, the second pseudo-echo signal is produced from the reception signal corresponding to the current time by the non-adaptive filtering means, the second pseudo-echo signal is subtracted from the transmission signal corresponding to the current time by the second subtracting means, the first filter coefficients renewed by the first adaptive filtering means at the current time are transmitted to the non-adaptive filtering means, and the echo suppressor further comprises third delaying means for delaying the second residual signal produced by the second subtracting means by the prescribed time-period to produce a delayed second residual signal, the double-talk state being detected according to the difference between the delayed second residual signal and the first residual signal.

In the above configuration, the first residual signal is produced from the transmission signal corresponding to the past time and the reception signal corresponding to the past time, the first filter coefficients are renewed according to the first residual signal corresponding to the past time, and the second pseudo-echo signal is produced from the reception signal corresponding to the current time according to the first filter coefficients corresponding to the past time.

Accordingly, the transition from the single-talk state to the double-talk state can be reliably detected.

It is preferred that the delaying means comprises:

first delaying means for receiving the reception signal corresponding to the past time and delaying the reception, signal by the prescribed time-period to produce a delayed reception signal corresponding to the past time, the second pseudo-echo signal being produced from the delayed reception signal by the non-adaptive filtering means; and second delaying means for receiving the transmission signal corresponds to the past time from the first caller and delaying the transmission signal by the prescribed time-period to produce a delayed transmission signal, the second pseudo-echo signal being subtracted from the delayed transmission signal by the second subtracting means, the first pseudo-echo signal is produced from the reception signal corresponding to the current time by the first adaptive filtering means, the first pseudo-echo signal is subtracted from the transmission signal corresponding to the current time by the first subtracting means, the first filter coefficients renewed by the first adaptive filtering means at the current time are transmitted to the non-adaptive filtering means, and the echo suppressor further comprises third delaying means for delaying the first residual signal produced by the first subtracting means by the prescribed time-period to produce a delayed first residual signal, the double-talk state being detected according to the difference between the second residual signal and the delayed first residual signal.

In the above configuration, the first residual signal is produced from the transmission signal corresponding to the current time and the reception signal corresponding to the current time, the first filter coefficients are renewed according to the first residual signal corresponding to the current time, and the second pseudo-echo signal is produced from the reception signal corresponding to the past time according to the first filter coefficients corresponding to the current time.

Accordingly, the transition from the single-talk state to the double-talk state can be reliably detected.

It is preferred that the delaying means comprises:

filter coefficient storing means for storing a group of the first filter coefficients renewed by the first adaptive filtering means each time the group of the first filter coefficients is renewed by the first adaptive filtering means and outputting the group of the first filter coefficients corresponding to the past time to the non-adaptive filtering means, the second pseudo-echo signal being produced from the reception signal corresponding to the current time according to the first filter coefficients corresponding to the past time, the first pseudo-echo signal is produced from the reception signal corresponding to the current time by the first adaptive filtering means, the first pseudo-echo signal is subtracted from the transmission signal corresponding to the current time by the first subtracting means, and the second pseudo-echo signal is subtracted from the transmission signal corresponding to the current time by the second subtracting means.

In the above configuration, the transmission of the group of the first filter coefficients renewed by the first adaptive filtering means to the non-adaptive filtering means is substantially delayed by the filter coefficient storing means. Therefore, the second pseudo-echo signal is produced from the reception signal corresponding to the current time according to the group of the first filter coefficients corresponding to the past time.

Accordingly, the transition from the single-talk state to the double-talk state can be reliably detected.

It is preferred that the echo suppressor further comprises:

filter coefficient transmission control means for controlling the transmission of a group of the first filter coefficients renewed by the first adaptive filtering means to the filter coefficient storing means according to the talk state detecting signal output from the detecting means each time the group of the first filter coefficients is renewed by the first adaptive filtering means, the group of the first filter coefficients being stored in the filter coefficient storing means in cases where the group of the first filter coefficients is adopted by the filter coefficient transmission control means.

In the above configuration, in cases where it is judged according to the talk state detecting signal that it is desired to abandon the group of the currently-renewed first filter coefficients, the group of the currently-renewed first filter coefficients is not adopted. In contrast, in cases where the group of the currently-renewed first filter coefficients is adopted, the group of the currently-renewed first filter coefficients is stored in the filter coefficient storing means.

Accordingly, because the group of the first filter coefficients currently renewed by the first adaptive filtering means is not adopted in cases where the group of the currently-renewed first filter coefficients is not desired, a memory capacity of the filter coefficient storing means can be reduced, and the double-talk state can be stably detected.

It is preferred that the non-adaptive filtering means comprises

N non-adaptive filtering units (N is an integer) for respectively producing a j-th pseudo-echo signal (j=2,3, . . . , N+1), in which a deterioration factor indicating the deterioration of the first filter coefficients renewed is included in the double-talk state, from the reception signal corresponding to the current time according to one group of the first filter coefficients stored in the filter coefficient storing means, the N groups of the first filter coefficients being different from each other, the second subtracting means comprises N second subtracting units, connected with the N non-adaptive filtering units in one-to-one correspondence, for respectively subtracting the j-th pseudo-echo signal produced by the corresponding non-adaptive filtering unit from the transmission signal corresponding to the current time to produce a j-th residual signal which indicates the deterioration factor in the double-talk state and approximates the first residual signal in the single-talk state, the double-talk state being detected by the detecting means according to a difference between the first residual signal and a group of one or more residual signals selected from the N residual signals.

In the above configuration, N residual signals are produced in the N second subtracting units according to the N groups of first filter coefficients different from each other, and the double-talk state is detected by the detecting means according to a difference between the first residual signal and a group of one or more residual signals selected from the N residual signals.

Accordingly, the transition to the double-talk state can be moreover reliably detected.

Also, because the number of residual signals used for the detection of the double-talk state can be adjusted according to environmental conditions, the echo suppressor can be useful for any environmental conditions.

DETAILED DESCRIPTION OF THE PREFERRED EMBODIMENTS

The invention will now be described with reference to the accompanying drawings.

Embodiment 1

In this embodiment, a double-talk state occurring in the first state transition, in which a single-talk state based on the existence of a voice of the far-end caller is changed to the double-talk state because of the addition of a voice of the near-end caller to the voice of the far-end caller, is detected in a double-talk detecting apparatus.

Figure 1:
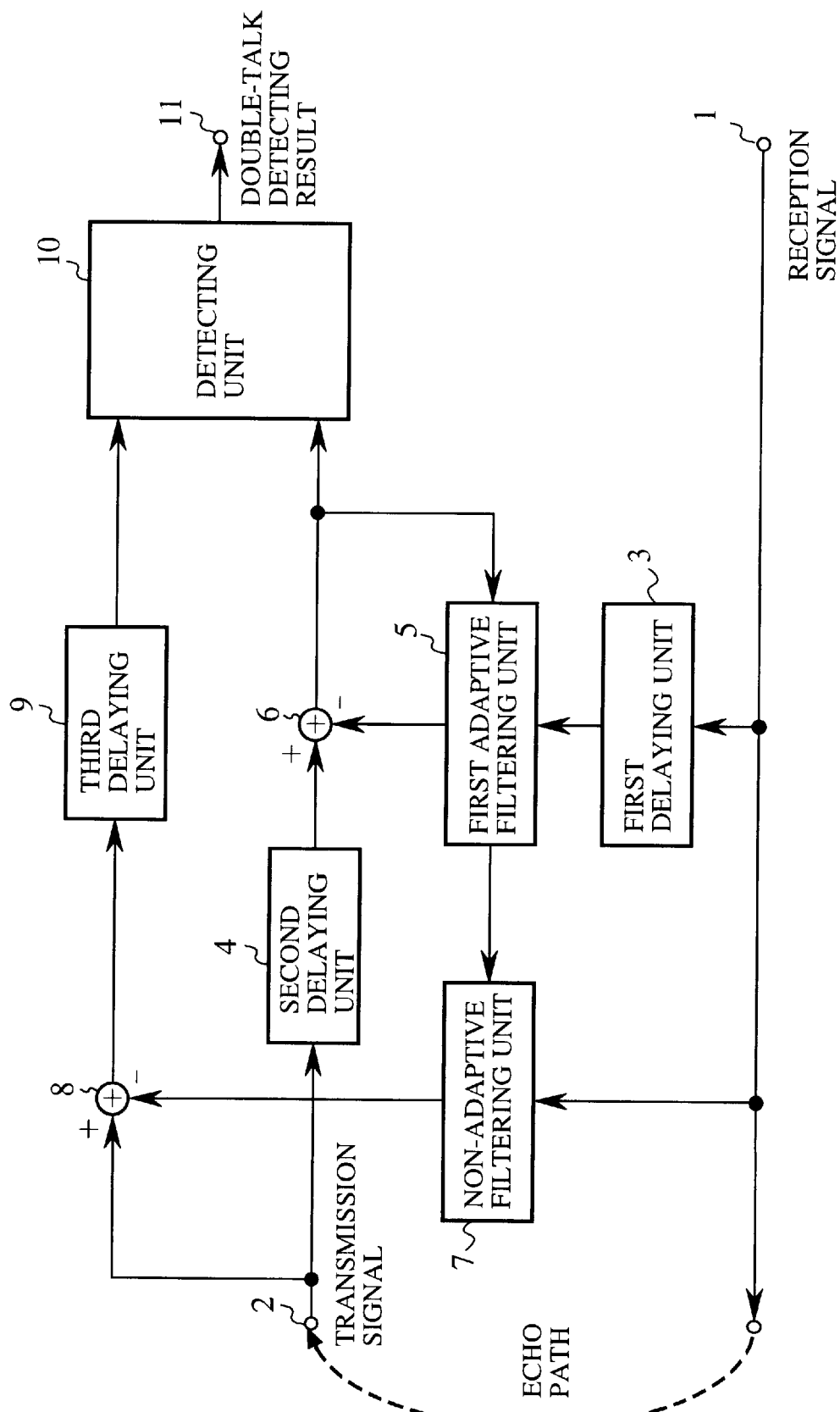
FIG. 1 is a block diagram of a double-talk detecting apparatus according to a first embodiment of the present invention.

FIG. 1 is a block diagram of a double-talk detecting apparatus according to a first embodiment of the present invention.

As shown in FIG. 1, a reference numeral 1 denotes an input terminal, and the input terminal 1 receives a reception signal indicating a voice of a far-end caller transmitted through a transmission path.

A reference numeral 2 denotes an input terminal, and the input terminal 2 receives an echo signal generated from the reception signal, which is transmitted from an output terminal of the reception signal through an echo path of a near-end caller Is side, according to an acoustic coupling or the like as a transmission signal in a single-talk state of the first state transition and receives a transmission signal, in which the echo signal is superposed on a near-end caller's voice, in a double-talk state of the first state transition.

A reference numeral 3 denotes a first delaying unit, and the first delaying unit 3 delays the reception signal received at the input terminal 1 by a prescribed time-period T to produce a delayed reception signal.

A reference numeral 4 denotes a second delaying-unit, and the second delaying unit 4 delays the transmission signal received at the input terminal 2 by the same prescribed time-period T to produce a delayed transmission signal. A reference numeral 5 denotes a first adaptive filtering unit having first filter coefficients, and the first adaptive filtering unit 5 always renews the first filter coefficients to make an impulse response based on the first filter coefficients approximate an actual impulse response of the echo path of the near-end caller's side, according to a first residual signal, which indicates a difference between the delayed transmission signal and a first pseudo-echo signal obtained from the delayed reception signal and performs a convolution calculation of the impulse response of the echo path for the delayed reception signal according to the renewed first filter coefficients to produce the first pseudo-echo signal. The renewed first filter coefficients deteriorate in the double-talk state.

A reference numeral 6 denotes a first subtracting unit, the first subtracting unit 6 subtracts the first pseudo-echo signal produced in the first adaptive filtering unit 5 from the delayed transmission signal produced in the second delaying unit 4 to produce the first residual signal, in which an echo component of the reception signal indicated by the echo signal is removed in the single-talk state, and outputs the first residual signal to the first adaptive filtering unit 5.

A reference numeral 7 denotes a non-adaptive filtering unit, the non-adaptive filtering unit 7 receives the renewed first filter coefficients, which is based on the reception signal received at the input terminal 1 at a past time prior to the current time by the prescribed time-period T, from the first adaptive filtering unit 5 and performs a convolution calculation of the impulse response of the echo path for the reception signal currently received at the input terminal 1 according to the renewed first filter coefficients to produce a second pseudo-echo signal in which a deterioration factor indicating the deterioration of the renewed first filter coefficients is included in the double-talk state.

A reference numeral 8 denotes a second subtracting unit, and the second subtracting unit 8 subtracts the second pseudo-echo signal produced in the non-adaptive filtering unit 7 from the transmission signal currently received in the input terminal 2 to produce a second residual signal indicating the deterioration of the renewed first filter coefficients in the double-talk state.

A reference numeral 9 denotes a third delaying unit, and the third delaying unit 9 delays the second residual signal produced in the second subtracting unit 8 by the same prescribed time-period T to produce a delayed second residual signal.

A reference numeral 10 denotes a detecting unit, and the detecting unit 10 judges whether or not a level ratio of the delayed second residual signal produced in the third delaying unit 9 to the first residual signal produced in the first subtracting unit 6 is equal to or larger than a prescribed value, detects a talk state as a double-talk state in cases where the level ratio is equal to or larger than the prescribed value and outputs a double-talk detecting result from an output terminal 11.

In the first adaptive filtering unit 5, a least mean square (LMS) algorithm is used as an adaptive algorithm to renew the first filter coefficients, so that the impulse response of the echo path of the near-end caller's side is approximated by using the renewed first filter coefficients. The renewal of the first filter coefficients in the first adaptive filtering unit 5 is always performed when a voice of the far-end caller exists.

In the above configuration, an operation of the double-talk detecting apparatus in a single-talk state of the first state transition is initially described.

In the first adaptive filtering unit 5, a convolution calculation of an impulse response of the echo of the near-end caller's side is performed for a delayed reception signal delayed in the first delaying unit 3 according to the first filter coefficients, and a first pseudo-echo signal approximating the echo signal is produced. Thereafter, in the first subtracting unit 6, the first pseudo-echo signal is subtracted from a delayed transmission signal delayed in the second delaying unit 4, and a first residual signal is produced. The first residual signal is output to the first adaptive filtering unit 5, and the first filter coefficients are always renewed according to the first residual signal to reduce the first residual signal. Therefore, the first pseudo-echo signal closely approximating the echo signal can be produced, and the first residual signal is minimized.

The renewed first filter coefficients are sent to the non-adaptive filtering unit 7. In the unit 7, a convolution calculation of the impulse response of the echo path is performed for a reception signal currently received at the input terminal 1 according to the renewed first filter coefficients, so that a second pseudo-echo signal is produced. In this case, though the renewed first filter coefficients are based on the reception signal received at a past time prior to the current time by a prescribed time-period T, because the time change of the echo signal is small, the second pseudo-echo signal closely approximates the echo signal, and a second residual signal obtained in the second subtracting unit 8 is minimized in the same manner as the first residual signal.

Thereafter, to keep the time consistency between the second residual signal and the first residual signal, the second residual signal is delayed in the third delaying unit 9 to produce the delayed second residual signal, and a level ratio of the delayed second residual signal to the first residual signal is checked in the detecting unit 10. Because the level ratio is almost equal to 1, a single-talk state is detected.

Next, an operation of the double-talk detecting apparatus in a double-talk state of the first state transition is described with reference to FIG. 11.

Figure 11:
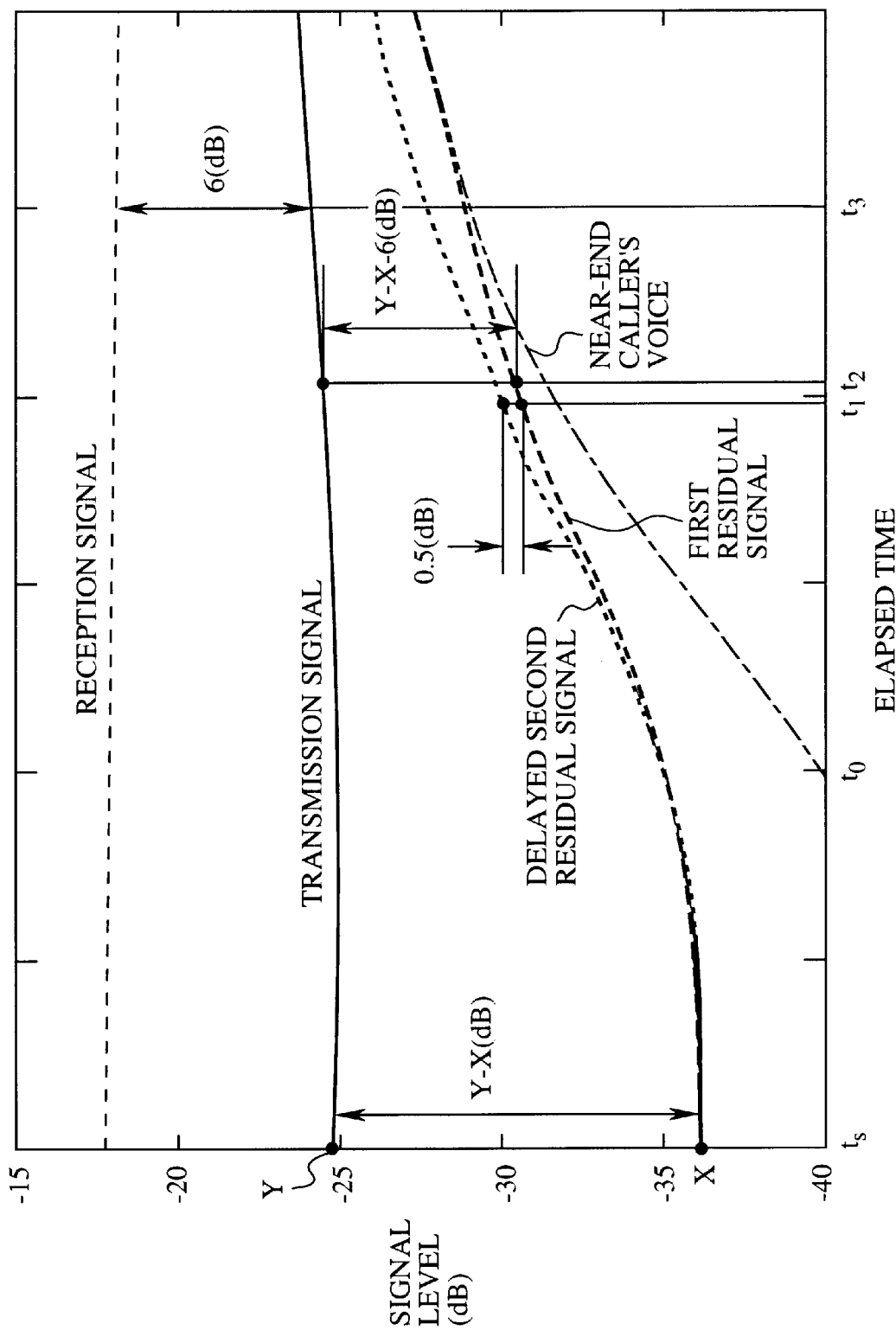
FIG. 11 shows a reception signal, a delayed transmission signal, a first residual signal, a delayed second residual signal and a transmission signal detected in the double-talk detecting apparatus shown in FIG. 1 in the first state transition.

FIG. 11 shows a reception signal, a delayed transmission signal, a first residual signal, a delayed second residual signal and a transmission signal detected in the double-talk detecting apparatus in the first state transition in which a single-talk state based on a far-end caller's voice is changed to a double-talk state based on the addition of a near-end caller's voice. The signals are indicated in a graph in which a Y-axis indicates a decibel (dB) level, and an X-axis indicates an elapsed time.

As shown in FIG. 11, a voice of the near-end caller is started at a time t0, so that a double-talk state is started. Thereafter, a difference between the delayed second residual signal and the first residual signal is increased with the time. The delayed second residual signal is always higher than the first residual signal.

In general, the first filter coefficients in the first adaptive filtering unit 5 is effectively renewed when an echo signal generated according to the convolution of the impulse response of the echo path from the reception signal, which is transmitted through the echo path of the near-end caller's side, is only input to the input terminal 2 as a transmission signal. That is, when no voice of the near-end caller exists, the first filter coefficients are effectively renewed. However, because a voice of the near-end caller is included in the transmission signal after the time t0, a talk state is changed to the double-talk state after the time t0. Therefore, the impulse response of the echo path cannot be correctly approximated by using the renewed first filter coefficients. Therefore, the impulse response of the echo path is erroneously assumed. Hereafter this is defined as the deterioration of the first filter coefficients of the first adaptive filtering unit 5.

In this case, the first filter coefficients are repeatedly renewed to always minimize the first residual signal regardless of whether the impulse response assumed by using the first filter coefficients approaches an ideal impulse response corresponding to the echo signal. Therefore, as shown in FIG. 11, the first filter coefficients are renewed after the time t0 to minimize the first residual signal while the first filter coefficients deteriorate. Therefore, a deterioration factor indicating the deterioration of the first filter coefficients- is concealed in the first residual signal, so that it is impossible to immediately detect the deterioration of the first filter coefficients by checking only the first residual signal.

In contrast, the deterioration factor is immediately indicated in the delayed second residual signal. The reason is as follows. When the first filter coefficients are renewed in the first adaptive filtering unit 5 in the double-talk state, the first filter coefficients deteriorate, and the deteriorating first filter coefficients are sent to the non-adaptive filtering unit 7. In the non-adaptive filtering unit 7, a convolution calculation of the impulse response of the echo path for the reception signal received at a current time is performed according to the deteriorating first filter coefficients. Because the deteriorating first filter coefficients are obtained from the reception signal transmitted at a past time which is prior to the current time by the prescribed time-period T, the deterioration factor included in the first filter coefficients is included in the second pseudo-echo signal produced in the non-adaptive filtering unit 7. Thereafter, when the second pseudo-echo signal is subtracted from the reception signal currently received to produce the second residual signal in the second subtracting unit 8, the deterioration factor is apparently indicated in the second residual signal.

Thereafter, to keep the time consistency between the second residual signal and the first residual signal, the second residual signal is delayed in the third delaying unit 9 to produce the delayed second residual signal.

In the present invention, because the deterioration factor is apparently indicated in the delayed second residual signal in contrast to the first residual signal in which the deterioration factor is concealed, a level difference between the delayed second residual signal and the first residual signal becomes large when the double-talk state is started. That is, in case of the single-talk state, the level difference becomes a very small value. In contrast, in case of the double-talk state, the level difference becomes remarkably large. Therefore, a level ratio of the delayed second residual signal to the first residual signal is checked in the detecting unit 10, and the double-talk state is immediately detected.

In the signals shown in FIG. 11, a gain of the echo path (that is, the level ratio of the transmission signal S to the reception signal X) is set to 0.5. Because the level ratio denotes a root-mean-square ratio (or an average amplitude ratio), the level ratio of 0.5 corresponds to −6 dB.

In cases where the first conventional double-talk detecting method A is applied for the detection of the double-talk state, it is required to determine the constants p1, p2 and p3 corresponding to the environmental conditions. When a gain ½ of the echo path is known, the constant p2 of the equation (2) corresponding to the gain of the echo path can be set to the gain 0.5. In this condition, when the time reach a time t3, a voice of the far-end caller exists (that is, the level X of the reception signal becomes higher than the constant value p1), and a level ratio S/X of the transmission signal to the reception signal becomes higher than p2=0.5. Therefore in the first conventional double-talk detecting method A, the 'second condition is satisfied, that is to say, in which the equation (1) is not satisfied but the equation (2) is satisfied. Accordingly, the double-talk state can be detected at the time t3.

However, in cases where the gain of the echo path is unknown, the constant p2 cannot be determined in advance. Therefore, the double-talk state detection cannot be performed by judging the equation (2), so that it is required to judge the third condition in which neither the equation (1) nor the equation (2) is satisfied but the equation (3) is satisfied. Because the convergence of the first filter coefficients is not considered in the first conventional double-talk detecting method A to detect the double-talk state, in cases where the renewal of the first filter coefficients of the first adaptive filtering unit 5 is performed from an initial condition, unless the constant p3 is set to a value equal to or higher than 1.0, the double-talk state is erroneously detected after the initial condition, so that the first filter coefficients cannot be renewed. Therefore, it is required to set the constant p3 to a value equal to or higher than 1.0. In cases where the constant p3 is set to 1.0, when the level E of the first residual signal becomes higher than the level S of the transmission signal, the double-talk state is detected. This means that the detection of the double-talk state is considerably delayed in case of the unknown gain of the echo path as compared with that in case of the known gain of the echo path.

Also, in case of the second conventional double-talk detecting method B is applied for the detection of the double-talk state, it is required to judge whether or not the first filter coefficients are sufficiently converged. Supposing that it is judged that the first filter coefficients are sufficiently converged at a time ts in FIG. 11 and a convergence ratio SM/EM (Y−X dB in FIG. 11) at the time ts is correctly determined, because a ratio Sj/Ej reaches a half value (corresponding to Y−X−6 dB in FIG. 11) of the converged ratio SM/EM at a time t2, the equation (4) is satisfied, so that the double-talk state can be detected at the time t2. Here, because the constant C2=½ is set in the equation (4), Sj/Ej corresponding to Y−X−6 dB satisfies Sj/Ej<C2*SM/EM.

However, in the second conventional double-talk detecting method B, there is a case that the judgment whether or not the first filter coefficients are sufficiently converged is not correctly performed. For example, in cases where it is erroneously judged that the first filter coefficients are sufficiently converged again at a certain time after the time ts, a second convergence ratio SM/EM at the certain time becomes lower than that at the time ts. Therefore, a second ratio Sj/Ej required to satisfy the equation (4) for the second convergence ratio SM/EM becomes lower than that at the time t2, so that a second detection time corresponding to the second ratio Sj/Ej becomes later than the time t2. Accordingly, in cases where the judgment whether or not the first filter coefficients are sufficiently converged is not correctly performed, there is a possibility that it takes a longer time to detect the double-talk state.

In contrast, in this embodiment, in cases where a difference between the delayed second residual signal and the first residual signal becomes a prescribed value corresponding to 0.5 dB, the double-talk state is detected in the detecting unit 10. That is, because the level ratio is equal to or larger than 0.5 dB at a time t1 in FIG. 11, the detection of the double-talk state is judged at the time t1 in the detecting unit 10. Here the value 0.5 dB represents a low limit margin for the detection of the double-talk state occurring in the first state transition in which the single-talk state based on the existence of a voice of the far-end caller is changed to the double-talk state.

The low limit margin is adjusted to 0.5 dB as a result of an experiment performed by the inventors of this application. That is, in cases where the low limit margin is set to 0.5 dB, even though the echo signal is changed with the echo path in a single-talk state to change a level ratio of the delayed second residual signal to the first residual signal, a double-talk state is not erroneously detected in the single-talk state, and the first state transition from the single-talk state to the double-talk state can be reliably judged.

Accordingly, because a deterioration degree of the first filter coefficients is -estimated according to a difference between the delayed second residual signal and the first residual signal and because the double-talk state is detected according to the level ratio of the delayed second residual signal to the first residual signal, it is not required to judge whether or not the first filter coefficients are sufficiently converged, and the double-talk state can be reliably detected in the first state transition while lessening a detection delay and without depending on any environmental conditions.

In the double-talk detecting apparatus according to this embodiment, the double-talk state occurring in the first state transition is detected. A voiceless state and a double-talk state occurring in the second state transition can be detected in a conventional double-talk detecting apparatus. Therefore, in cases where the double-talk detecting apparatus according to this embodiment is combined with the conventional double-talk detecting apparatus, a final judging result can be obtained from the double-talk detecting result of the double-talk detecting apparatus and another double-talk detecting result of the conventional double-talk detecting apparatus.

In this embodiment and following embodiments, the LMS algorithm is used. However, another adaptive algorithm such as Karman method is applicable to renew the first filter coefficients.

Embodiment 2

In this embodiment, a double-talk state occurring in the first state transition is detected in a double-talk detecting apparatus.

Figure 2:
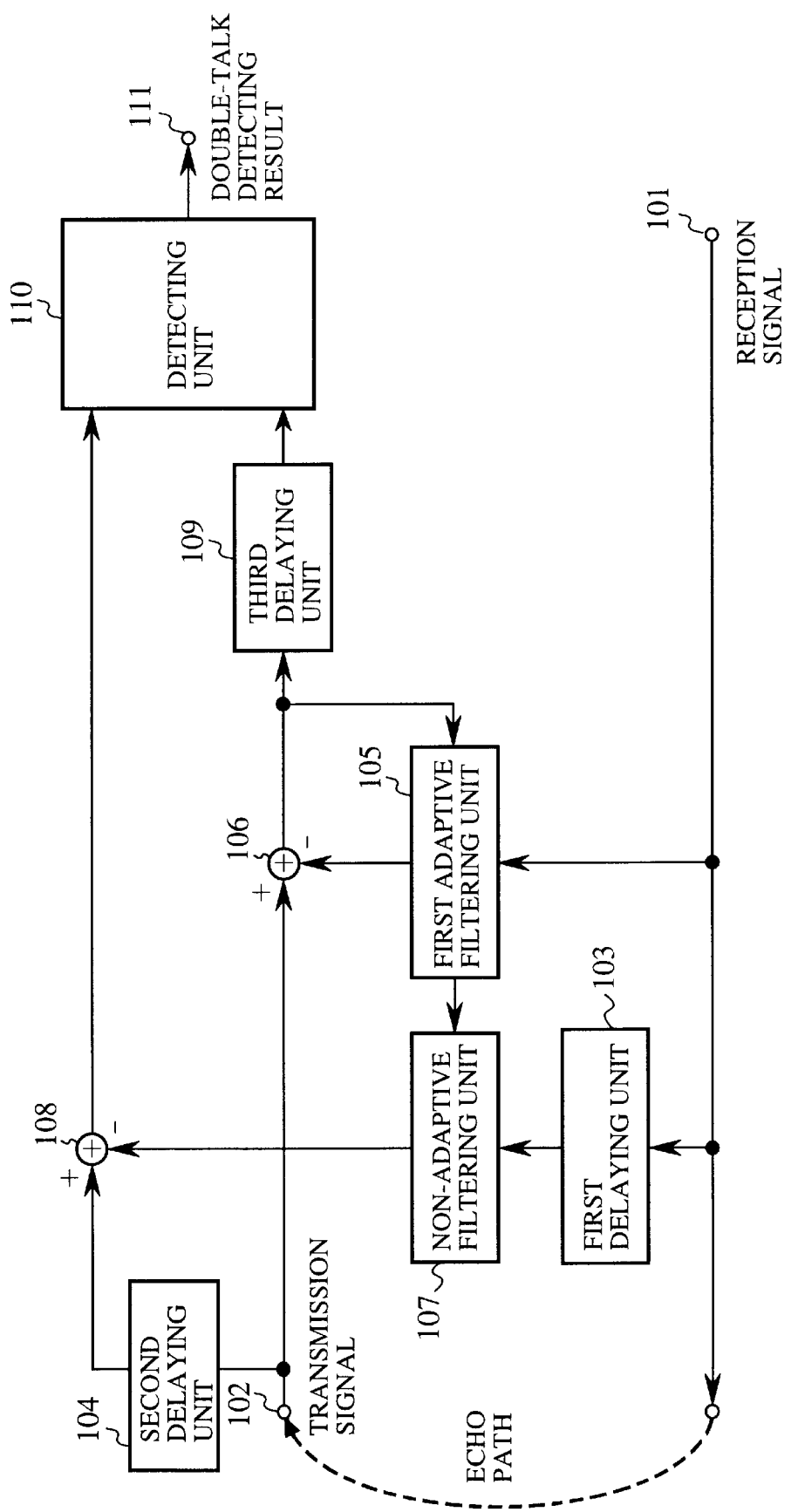
FIG. 2 is a block diagram of a double-talk detecting apparatus according to a second embodiment of the present invention.

FIG. 2 is a block diagram of a double-talk detecting apparatus according to a second embodiment of the present invention.

As shown in FIG. 2, a reference numeral ,101 denotes an input terminal, and the input terminal 101 receives a reception signal indicating a voice of a far-end caller transmitted through a transmission path.

A reference numeral 102 denotes an input terminal, and the input terminal 102 receives an echo signal generated from the reception signal, which is transmitted from an output terminal of the reception signal through an echo path of a near-end caller's side, according to an acoustic coupling or the like as a transmission signal in a single-talk state of the first state transition and receives a transmission signal, in which the echo signal is superposed on a near-end caller's voice, in a double-talk state of the first state transition.

A reference numeral 103 denotes a first delaying unit, and the first delaying unit 103- delays the reception signal received at the input terminal 101 by a prescribed time-period T to produce a delayed reception signal.

A reference numeral 104 denotes a second delaying unit, and the second delaying unit 104 delays the transmission signal received at the input terminal 102 by the same prescribed time-period T:to produce a delayed transmission signal.

A reference numeral 105 denotes a first adaptive filtering unit having first filter coefficients, and the first adaptive filtering unit 105 always renews the first filter coefficients to make an impulse response based on the first filter coefficients approximate an actual impulse response of the echo path of the near-end caller's side, according to a first residual signal, which indicates a difference between the transmission signal and a first pseudo-echo signal obtained from the reception signal and performs a convolution calculation of the impulse response of the echo path for the reception signal currently received at the input terminal 101 according to the renewed first filter coefficients to produce the first pseudo-echo signal. The renewed first filter coefficients deteriorating in the double-talk state.

A reference numeral 106 denotes a first subtracting unit, the first subtracting unit 106 subtracts the first pseudo-echo signal produced in the first adaptive filtering unit 105 from the transmission signal currently received at the input terminal 102 to produce the first residual signal, in which an echo component of the reception signal indicated by the echo signal is removed in the single-talk state, and outputs the first residual signal to the first adaptive filtering unit 105.

A reference numeral 107 denotes a non-adaptive filtering unit, the non-adaptive filtering unit 107 receives the renewed first filter coefficients, which is based on the reception signal received at the input terminal 101 at the current time, from the first adaptive filtering unit 105 and performs a convolution calculation of the impulse response of the echo path for the delayed reception signal, which is based on the reception signal received at the input terminal 101 at a past time prior to the current time by the prescribed time-period T, according to the renewed first filter coefficients to produce a second pseudo-echo signal in which a deterioration factor indicating the deterioration of the renewed first filter coefficients is included.

A reference numeral 108 denotes a second subtracting unit, and the second subtracting unit 108 subtracts the second pseudo-echo signal produced in the non-adaptive filtering unit 107 from the delayed transmission signal produced in the second delaying unit 104 to produce a second residual signal indicating the deterioration of the renewed first filter coefficients.

A reference numeral 109 denotes a third delaying unit, and the third delaying unit 109 delays the first residual signal produced in the first subtracting unit 106 by the same prescribed time-period T to produce a delayed first residual signal.

A reference numeral 110 denotes a detecting unit, and the detecting unit 110 judges whether or not a level ratio of the second residual signal produced in the second subtracting unit 108 to the delayed first residual signal produced in the third delaying unit 109 is equal to or larger than a prescribed value, detects a talk state as a double-talk state in cases where the level ratio is equal to or larger than the prescribed value and outputs a double-talk detecting result from an output terminal 111.

In the first adaptive filtering unit 105, the LMS algorithm is used to renew the first filter coefficients. The renewal of the first filter coefficients in the first adaptive filtering unit 105 is always performed when a voice of the far-end caller exists.

In the above configuration, an operation of the double-talk detecting apparatus in the first state transition is described.

In the first adaptive filtering unit 105, a first pseudo-echo signal approximating the echo signal is produced from a reception signal currently received from the far-end caller at the input terminal 101 according to the first filter coefficients. Thereafter, in the first subtracting unit 106, the first pseudo-echo signal is subtracted from a transmission signal currently received at the input terminal 102, and a first residual signal is produced. The first residual signal is output to the first adaptive filtering unit 105 to always renew the first filter coefficients according to the first residual signal, so that the first residual signal is reduced. Therefore, in cases where no near-end caller's voice exists in the transmission signal, the first pseudo-echo signal closely approximating the echo signal is produced in the same manner as in the first embodiment, and the first residual signal is minimized.

The renewed first filter coefficients are sent to the non-adaptive filtering unit 107, and a second pseudo-echo signal is produced from a delayed reception signal received at the input terminal 101 at a past time prior to the current time by a prescribed time-period T according to the renewed first filter coefficients -based on the reception signal currently received.

Therefore, because a receiving time of the reception signal used for the renewal of the first filter coefficients differs from that of the reception signal processed in the non-adaptive filtering unit 107, in cases where the echo signal is superposed on a near-end caller's voice to change the single-talk state to the double-talk state, the first filter coefficients deteriorate in the renewal operation, a deterioration factor is included in the second pseudo-echo signal in the same manner as in the first embodiment, and the deterioration factor is apparently indicated as a second residual signal obtained in the second subtracting unit 108.

Thereafter, in the detecting unit 110, a level ratio of the second residual signal to the delayed first residual signal is checked. In case of the single-talk state, the level ratio is almost equal to 1 in the same manner as in the first embodiment. In contrast, in cases where the single-talk state is changed to the double-talk state in the first state transition, because the deterioration factor is apparently indicated in the second residual signal, the level ratio becomes sufficiently large (for example, 0.5 dB). Therefore, the double-talk state is immediately detected, and a double-talk detecting result is output.

Accordingly, because a deterioration degree of the first filter coefficients is estimated according to a difference between the second residual signal and the delayed first residual signal and because the double-talk state is detected according to the level ratio of the second residual signal to the delayed first residual signal, it is not required to judge whether or not the first filter coefficients are sufficiently converged, and the double-talk state can be reliably detected in the first state transition while lessening a detection delay and without depending on any environmental conditions.

In the double-talk detecting apparatus according to this embodiment, the double-talk state occurring in the first state transition is detected. A voiceless state and a double-talk state occurring in the second state transition can be detected in a conventional double-talk detecting apparatus. Therefore, in cases where the double-talk detecting apparatus according to this embodiment is combined with the conventional double-talk detecting apparatus, a final judging result can be obtained from the double-talk detecting result of the double-talk detecting apparatus and another double-talk detecting result of the conventional double-talk detecting apparatus.

Embodiment 3

Figure 3:
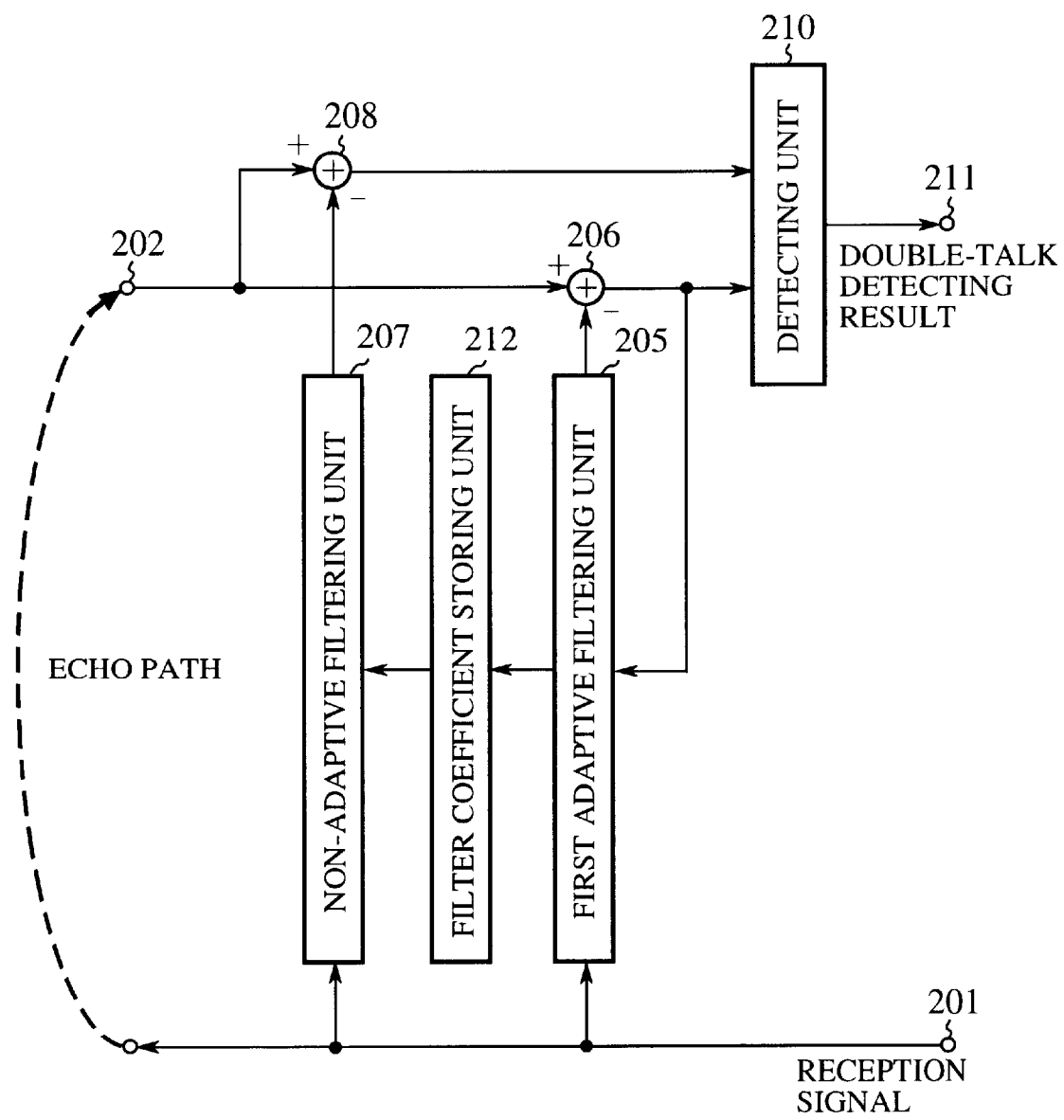
FIG. 3 is a block diagram of a double-talk detecting apparatus according to a third embodiment of the present invention.

FIG. 3 is a block diagram of a double-talk detecting apparatus according to a third embodiment of the present invention.

As shown in FIG. 3, a reference numeral 201 denotes an input terminal, and the input terminal 201 receives a reception signal indicating a voice of a far-end caller transmitted through a transmission path.

A reference numeral 202 denotes an input terminal, and the input terminal 202 receives an echo signal generated from the reception signal, which is transmitted from an output terminal of the reception signal through an echo path of a near-end caller's side, according to an acoustic coupling or the like as a transmission signal in a single-talk state of the first state transition and receives a transmission signal, in which the echo signal is superposed on a near-end caller's voice, in a double-talk state of the first state transition.

A reference numeral 205 denotes a first adaptive filtering unit having first filter coefficients, and the first adaptive filtering unit 205 always renews the first filter coefficients in renewal time-intervals to make an impulse response based on the first filter coefficients approximate an actual impulse response of the echo path of the near-end caller's side, according to a first residual signal, which indicates a difference between the transmission signal and a first pseudo-echo signal obtained from the reception signal and performs a convolution calculation of the impulse response of the echo path for the reception signal currently received at the input terminal 201 according to the first filter coefficients currently-renewed to produce the first pseudo-echo signal. The renewed first filter coefficients deteriorate in the double-talk state.

A reference numeral 206 denotes a first subtracting unit, the first subtracting unit 206 subtracts the first pseudo-echo signal produced in the first adaptive filtering unit 205 from the transmission signal currently received at the input terminal 202 to produce the first residual signal, in which an echo component of the reception signal indicated by the echo signal is removed in the single-talk state, and outputs the first residual signal to the first adaptive filtering unit 205.

A reference numeral 212 denotes a filter coefficient storing unit, and the filter coefficient storing unit 212 receives a group of the first filter coefficients currently-renewed in the first adaptive filtering unit 205 each time the group of the first filter coefficients are renewed in the first adaptive filtering unit 205 and repeatedly stores the group of the renewed first filter coefficients, while abandoning the (N+1)-th group of the first filter coefficients renewed just before the N renewal operations recently performed, to always store N groups of the renewed first filter coefficients recently obtained. The i-th group (i=1,2, . . . , N) of the renewed first filter coefficients is obtained just before the (i−1)-th renewed first filter coefficients.

A reference numeral 207 denotes a non-adaptive filtering unit, the non-adaptive filtering unit 207 receives the N-th group of the first filter coefficients from the filter coefficient storing unit 212 and performs a convolution calculation of the impulse response of the echo path for the reception signal currently received at the input terminal 201, according to the N-th group of the renewed first filter coefficients to produce a second pseudo-echo signal in which a deterioration factor indicating the deterioration of the renewed first filter coefficients is included in the double-talk state. N times of the renewal time-period is equivalent to the prescribed time-period T.

A reference numeral 208 denotes a second subtracting unit, and the second subtracting unit 208 subtracts the second pseudo-echo signal produced in the non-adaptive filtering unit 207 from the transmission signal currently received at the input terminal 202 to produce a second residual signal indicating the deterioration of the renewed first filter coefficients in the double-talk state.

A reference numeral 210 denotes a detecting unit, and the detecting unit 210 judges whether or not a level ratio of the second residual signal produced in the second subtracting unit 208 to the first residual signal produced in the first subtracting unit 206 is equal to or larger than a prescribed value, detects a talk state as a double-talk state in cases where the level ratio is equal to or larger than the prescribed value and outputs a double-talk detecting result from an output terminal 211.

In the first adaptive filtering unit 205, the LMS algorithm is used to renew the first filter coefficients. The renewal of the first filter coefficients in the first adaptive filtering unit 205 is always performed when a voice of the far-end caller exists.

In the above configuration, the renewal of the first filter coefficients and the production of a first residual signal are performed in the first adaptive filtering unit 205 and first subtracting unit 206 in the same manner as the renewal and production performed in the first adaptive filtering unit 105 and the first subtracting unit 106 shown in FIG. 2. Thereafter, the first residual signal is input to the detecting unit 210. Also, the group of the first filter coefficients currently-renewed are received in the filter coefficient storing unit 212 each time the renewal operation is performed in the first adaptive filtering unit 205, and N groups of the first filter coefficients recently renewed are always stored in the filter coefficient storing unit 212.

Thereafter, the N-th group of the first filter coefficients corresponding to the most past time in the N groups stored in the filter coefficient storing unit 212 are transmitted to the non-adaptive filtering unit 207. In this unit 207, a second pseudo-echo signal is produced from a reception signal currently received at the input terminal 201 according to the N-th group of the renewed first filter coefficients in the same manner as the production performed in the non-adaptive filtering unit 7 or 107 in the first and second embodiments. Thereafter, in the second subtracting unit 208, the second pseudo-echo signal is subtracted from the reception signal currently received at the input terminal 201 to produce a second residual signal, and the second residual signal is input to the detecting unit 210. Thereafter, in the detecting unit 210, a double-talk state is detected according to the first residual signal and the second residual signal in the same manner as the detection performed in the detecting unit 10 or 110 in the first and second embodiments.

Accordingly, because a second pseudo-echo signal is produced in the non-adaptive filtering unit 207 according to the N-th group of the renewed first filter coefficients obtained at a past time prior to the current time by the N times of the renewal time-period equivalent to the prescribed time-period T, it is not required to judge whether or not the first filter coefficients are sufficiently converged, and the double-talk state can be , reliably detected in the first state transition while lessening a detection delay and without depending on any environmental conditions.

Also, because no delaying unit arranged on the signal transmission line of the reception signal- or the transmission signal in the first embodiment or the second embodiment is used in this embodiment, the detection delay for the transition to the double-talk state can- be shortened, and the double-talk detecting apparatus,not depending on any operation condition can be obtained.

In the double-talk detecting apparatus according to this embodiment, the double-talk state occurring in the first state transition is detected. A voiceless state and a double-talk state occurring in the second state transition can be detected in a conventional double-talk detecting apparatus. Therefore, in cases where the double-talk detecting apparatus according to this embodiment is combined with the conventional double-talk detecting apparatus, a final judging result can be obtained from the double-talk detecting result of the double-talk detecting apparatus and another double-talk detecting result of the conventional double-talk detecting apparatus.

Embodiment 4

Figure 4:
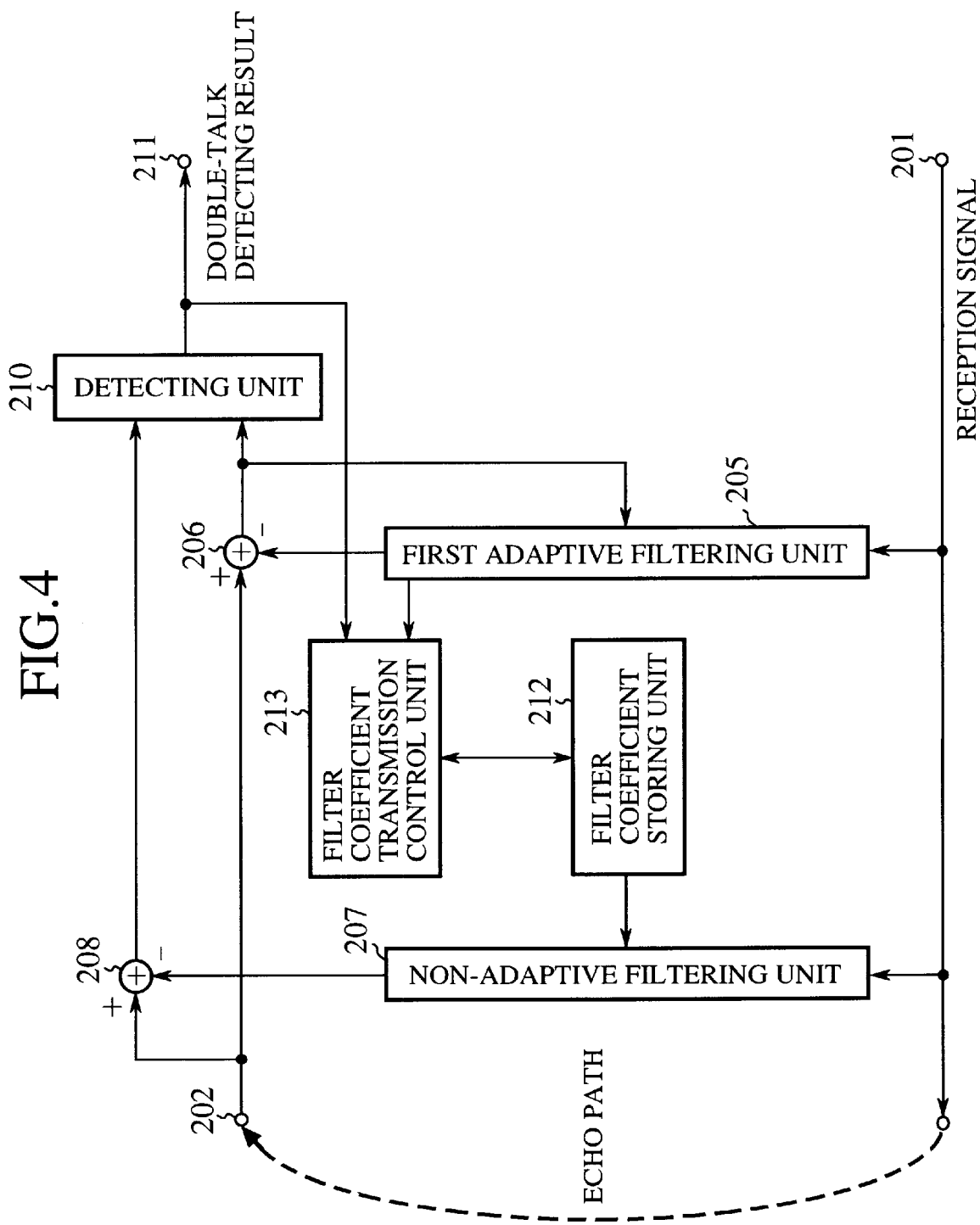
FIG. 4 is a block diagram of a double-talk detecting apparatus according to a fourth embodiment of the present invention.

FIG. 4 is a block diagram of a double-talk detecting apparatus according to a fourth embodiment of the present invention. The description of composing elements indicated by reference numerals, which are the same as, those used in FIG. 3, is omitted because the composing elements of FIG. 4 are the same as or equivalent to those of FIG. 3 indicated by the same reference numerals as those of FIG. 4.

As shown in FIG. 4, a double-talk detecting apparatus comprises:

the input terminal 201; the input terminal 202; the first adaptive filtering unit 205; the first subtracting unit 206; and the filter coefficient storing unit 212 for repeatedly receiving one group of the first filter coefficients currently renewed in the first adaptive filtering unit 2,05 and storing the group of the first filter coefficients while abandoning the (N+1)-th group of the first filter coefficients stored prior to the other N groups of the first filter coefficients stored, to always store the N groups of the first filter coefficients recently renewed in the first adaptive filtering unit 205, the i-th group (i=1,2, . . . , N) of the renewed first filter coefficients being stored just before the (i−1)-th group of the renewed first filter coefficients.

In addition, a reference numeral 213 denotes a filter coefficient transmission control unit, and the filter coefficient transmission control unit 213 controls the transmission of a group of the first filter coefficients currently renewed in the first adaptive filtering unit 205 by comparing the group of the currently-renewed first filter coefficients with the N groups of the first filter coefficients stored in the filter coefficient storing unit 212, by abandoning the group of the currently-renewed first filter coefficients in cases where it is judged according to a double-talk detecting result that the group of the currently-renewed first filter coefficients considerably deteriorates or the group of the currently-renewed first filter coefficients is almost the same as the N groups of the first filter coefficients stored in the filter coefficient storing unit 212, by allowing the adoption of the group of the currently-renewed first filter coefficients in cases where the abandoning of the group of the currently-renewed first filter coefficients is not judged, and by transmitting the adoption-allowed group of the currently-renewed first filter coefficients to the filter coefficient storing unit 212 to store the group of the currently-renewed first filter coefficients in the filter coefficient storing unit 212 as the first group of the first filter coefficients renewed.

The double-talk detecting apparatus further comprises: the non-adaptive filtering unit 207; the second subtracting unit 208; and the detecting unit 210 for judging whether or not a level ratio of the second residual signal produced in the second subtracting unit 208 to the first residual signal produced in the first subtracting unit 206 is equal to or larger than a prescribed value, detecting a talk state as a double-talk state in cases where the level ratio is equal to or larger than the prescribed value and outputting the double-talk detecting result from an output terminal 211 to the filter coefficient transmission control unit 213 and an outside apparatus.

In the above configuration, an operation of the double-talk detecting apparatus is described.

There is a first case that a group of the first filter coefficients renewed in the first adaptive filtering unit 205 is suddenly changed though the single-talk state is continued. In this case, it is assumed that the group of the first filter coefficients renewed considerably deteriorates, so that it is better that the group of the first filter coefficients renewed is abandoned.

Also, in cases where the steady condition of the reception signal continues for a long time in the single-talk state, a plurality of groups of the first filter coefficients renewed in the first adaptive filtering unit 205 are almost the same as each other. In this second case, it is better that the groups of the renewed first filter coefficients almost the same as each other are abandoned.

In this embodiment, a double-talk detecting result obtained in the detecting unit 210 is sent to the filter coefficient transmission control unit 213. In the unit 213, it is detected whether or not a talk state is the single-talk state or the double-talk state, and the group of the currently-renewed first filter coefficients is compared with the N groups of the first filter coefficients stored in the filter coefficient, storing unit 212. In cases where the group of the currently-renewed first filter coefficients is suddenly changed in the single-talk state, it is assumed that the group of the currently-renewed first filter coefficients considerably deteriorates, so that the group of the currently-renewed first filter coefficients is abandoned. Also, in cases where the group of the currently-renewed first filter coefficients is almost the same as the N groups of the first filter coefficients stored in the filter coefficient storing unit 212 in the single-talk state, it is assumed that the steady condition of the reception signal continues for a long time in the single-talk state, so that the group of the currently-renewed first filter coefficients is abandoned.

In contrast, in cases where the group of the currently-renewed first filter coefficients is not abandoned but is adopted, the group of the currently-renewed first filter coefficients is transmitted to the filter coefficient storing unit 212, and the group of the currently-renewed first filter coefficients is stored in the storing unit 212 as the first group of the first filter coefficients while the (N+1)-th group of the first filter coefficients stored prior to the other N groups of the first filter coefficients stored is abandoned. Therefore, the N groups of the first filter coefficients, which are recently renewed in the first adaptive filtering unit 205 and are allowed in the filter coefficient transmission control unit 213, are stored in the filter coefficient storing unit 212.

Thereafter, in the non-adaptive filtering unit 207, a second pseudo-echo signal is produced from a reception signal currently received at the input terminal 201 according to the N-th group of the first filter coefficients oldest in the storing unit 212 in the same manner as in the third embodiment, and the double-talk state is detected in the same manner as in the third embodiment.

Accordingly, because the group of the currently-renewed first filter coefficients is abandoned in cases where the group of the currently-renewed first filter coefficients considerably deteriorates or the group of the currently-renewed first filter coefficients is almost the same as the N groups of the first filter coefficients stored in the filter coefficient storing unit 212, the double-talk state can be stably detected.

Also, because the group of the currently-renewed first filter coefficients is not stored each time the group of the currently-renewed first filter coefficients is obtained in the first adaptive filtering unit 205, even though a memory capacity of the filter coefficient storing unit 212 is lower than that in the third embodiment, the double-talk state can be stably detected. Therefore, the memory capacity of the filter coefficient storing unit 212 can be lessened.

Also, in the same manner as in the third embodiment, no delaying unit is required, it is not required to judge whether or not the first filter coefficients are sufficiently converged, and the double-talk state can be reliably detected in the first state transition while lessening a detection delay and without depending on any environmental conditions.

In this embodiment, the group of the currently-renewed first filter coefficients is compared in the filter coefficient transmission control unit 213 with all the N groups of the first filter coefficients stored in the filter coefficient storing unit 212. However, it is applicable that the group of the currently-renewed first filter coefficients be compared with one or more groups of the first filter coefficients selected from the N groups of the first filter coefficients.

Embodiment 5

Figure 5:
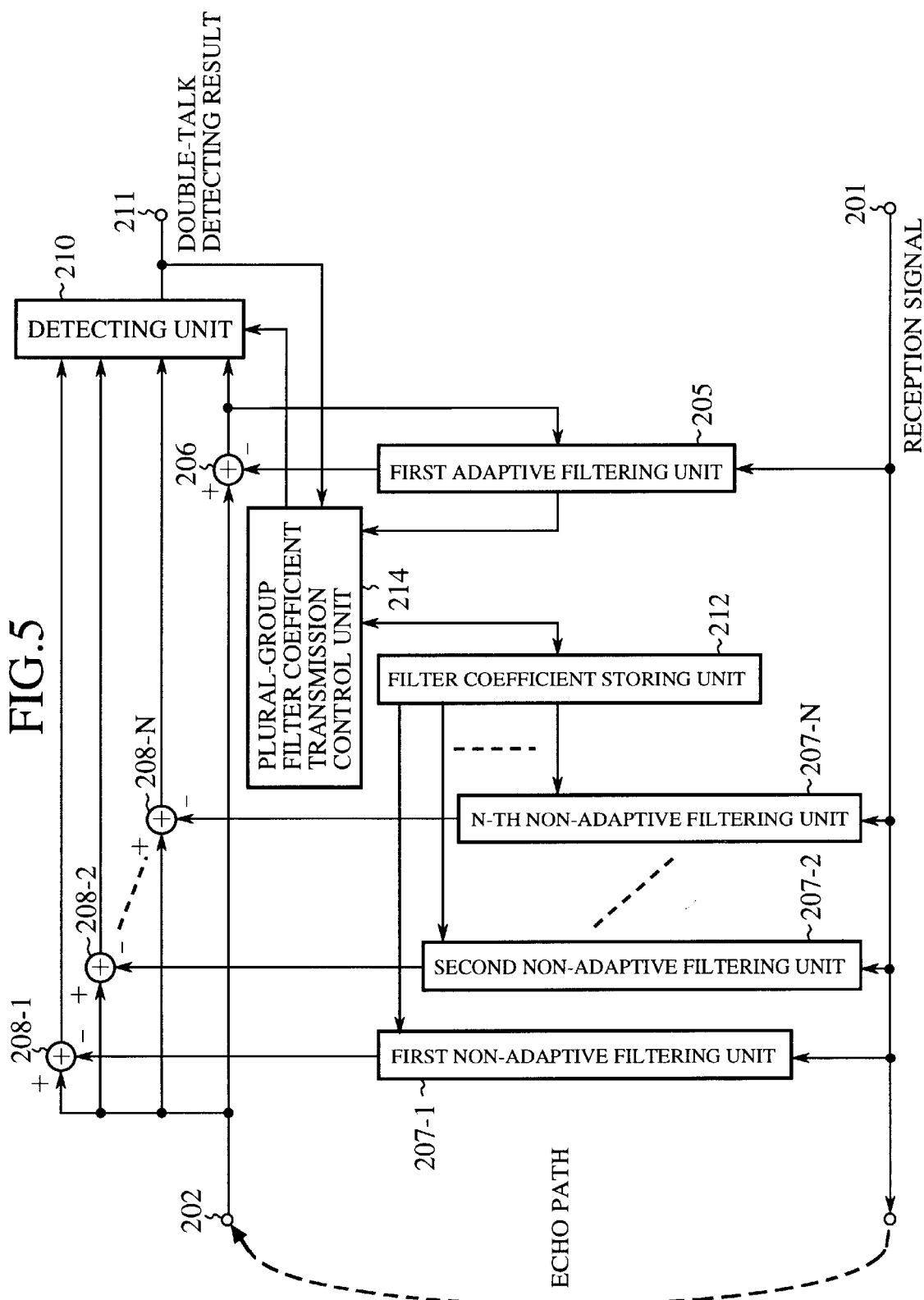
FIG. 5 is a block diagram of a double-talk detecting apparatus according to a fifth embodiment of the present invention.

FIG. 5 is a block diagram of a double-talk detecting apparatus according to a fifth embodiment of the present invention. The description of composing elements indicated by reference numerals, which are the same as those used in FIG. 3, is omitted because the composing elements of FIG. 5 are the same as or equivalent to those of FIG. 3 indicated by the same reference numerals as those of FIG. 5.

As shown in FIG. 5, a double-talk detecting apparatus comprises:

the input terminal 201; the input terminal 202; the first adaptive filtering unit 205; the first subtracting unit 206; and the filter coefficient storing unit 212 for repeatedly receiving one group of the first filter coefficients currently renewed in the first adaptive filtering unit 205 and storing the group of the first filter coefficients while abandoning the (M+1)-th group of the first filter coefficients stored prior to the other M groups of the first filter coefficients stored, to always store the M groups of the first filter coefficients recently renewed in the first adaptive filtering unit 205, the i-th group (i=1,2, . . . , M) of the renewed first filter coefficients being stored just before the (i−1)-th group of the renewed first filter coefficients.

In addition, a reference numeral 207 denotes N (M≧N) non-adaptive filtering units (represented by a first non-adaptive filtering unit 207-1, a second non-adaptive filtering unit 207-2, and an N-th non-adaptive filtering unit 207-N). Each non-adaptive filtering unit 207 receives one group of the renewed first filter coefficients from the filter coefficient storing unit 212 and performs a convolution calculation of the impulse response of the echo path for the reception signal currently received at the input terminal 201, according to the group of the renewed first filter coefficients to produce a j-th pseudo-echo signal (j=2,3, . . . , N+1) in which a deterioration factor indicating the deterioration of the renewed, first filter coefficients is included. The N groups of the renewed first filter coefficients received in the N non-adaptive filtering units 207 are different from each other, and the j-th group of the renewed first filter coefficients received in the j-th non-adaptive filtering unit 207-j is obtained in the first adaptive filtering unit 205 prior to the (j−1)-th group of the renewed first filter coefficients received in the (j−1)-th non-adaptive filtering unit 207-(j−1).

A reference numeral 208 denotes N second subtracting units (represented by a second subtracting unit 208-1, a second subtracting unit 208-2 and an second subtracting unit 208-N). Each second subtracting unit 208 subtracts the j-th pseudo-echo signal produced in the non-adaptive filtering unit 207-(j−1) from the transmission signal currently received in the input terminal 202 to produce a j-th residual signal indicating the deterioration of the group of the renewed first filter coefficients in the double-talk state.

A reference numeral 214 denotes a plural-group filter coefficient transmission control unit, and the plural-group filter coefficient transmission control unit 214 controls the transmission of a group of the first filter coefficients currently renewed in the first adaptive filtering unit 205. That is, the plural-group filter coefficient transmission control unit 214 compares the group of the currently-renewed first filter coefficients with the M groups of the first filter coefficients stored in the filter coefficient storing unit 212, the plural-group filter coefficient transmission control unit 214 abandons the group of the currently-renewed first filter coefficients in cases where it is judged according to a double-talk detecting result that the group of the currently-renewed first filter coefficients considerably deteriorates or the group of the currently-renewed first filter coefficients is almost the same as the M groups of the first filter coefficients stored in the filter coefficient storing unit 212, the plural-group filter coefficient transmission control unit 214 allows the adoption of the group of the currently-renewed first filter coefficients in cases where the abandoning of the group of the currently-renewed first filter coefficients is not judged, and the plural-group filter coefficient transmission control unit 214 transmits the adoption-allowed group of the currently-renewed first filter coefficients to the filter coefficient storing unit 212 to store the group of the currently-renewed first filter coefficients in the filter coefficient storing unit 212 as the first group of the first filter coefficients renewed. Thereafter, the plural-group filter coefficient transmission control unit 214 outputs a control signal which indicates one or more non-adaptive filtering units 207 selected from the N non-adaptive filtering units 207.

The double-talk detecting apparatus further comprises the detecting unit 210 for selecting one or more j-th residual signals produced in one or more second subtracting units 208 corresponding to one or more non-adaptive filtering units 207 according to the control signal output from the plural-group filter coefficient transmission control unit 214, determining an average residual signal having an average power of one or more powers of the j-th residual signals, judging whether or not a level ratio of the average residual signal to the first residual signal produced in the first subtracting unit 206 is equal to or larger than a prescribed value, detecting a talk state as a double-talk state in cases where the level ratio is equal to or larger than the prescribed value and outputting the double-talk detecting result from an output terminal 211 to the plural-group filter coefficient transmission control unit 214 and an outside apparatus.

In the above configuration, the transmission of the group of the currently-renewed first filter coefficients is controlled in the plural-group filter coefficient transmission control unit 214 in the same manner as the control of the filter coefficient transmission control unit 213 of the fourth embodiment, and the group of the currently-renewed first filter coefficients adopted in the plural-group filter coefficient transmission control unit 214 is stored in the filter coefficient storing unit 212 in the same manner as in the fourth embodiment. Thereafter, N groups of the renewed first filter coefficients are selected from the M groups of the renewed first filter coefficients (M≧N) stored in the filter coefficient storing unit 212 according to a predetermined selection and are stored in the N non-adaptive filtering units 207 in one-to-one correspondence.

Thereafter, in each non-adaptive filtering unit 207, a j-th pseudo-echo signal is produced from a reception signal currently received at the input terminal 201 according to the (j−1)-th group of the first filter coefficients in the same manner as in the third embodiment, and the N pseudo-echo signals are sent to the detecting unit 210.

In the detecting unit 210, one or more residual signals produced in one or more second subtracting units 208 corresponding to one or more non-adaptive filtering units 207 are selected from the N residual signals according to the control signal output from the plural-group filter coefficient transmission control unit 214. For example, in cases where it is judged in the plural-group filter coefficient transmission control unit 214 that a steady condition of the reception signal is continued in the single-talk state, the control signal is output to the detecting unit 210 to decrease the number of selected residual signals. Also, in cases where the transition from the single-talk state to the double-talk state is detected in the plural-group filter coefficient transmission control unit 214 according to the double-talk detecting result transmitted from the detecting unit 210, the control signal is output to the detecting unit 210 to increase the number of selected residual signals. Thereafter, an average residual signal having an average power of one or more powers of the selected residual signals is determined, and a double-talk detecting result is obtained according to the average residual signal and the first residual signal produced in the first subtracting unit 206 in the same manner as in the third embodiment.

Accordingly, because the transition from the single-talk state to the double-talk state is detected according to one or more residual signals based on one or more groups of the renewed first filter coefficients, the transition to the double-talk state can be moreover reliably detected.

Also, because the number of one or more residual signals selected in the detecting unit 210 is changed in dependence on environmental conditions, a stable operation of the double-talk detecting apparatus can be performed in any environmental conditions. Therefore, the double-talk detecting apparatus is useful in any environmental conditions.

Also, because the group of the currently-renewed first filter coefficients is abandoned in the same manner as in the fourth embodiment, the double-talk state can be stably detected in the same manner as in the fourth embodiment.

In this embodiment, the control signal indicating the selection of one or more residual signals corresponding to one or more non-adaptive filtering units 207 is automatically produced in the plural-group filter coefficient transmission control unit 214. However, it is applicable that the selection of one or more residual signals be manually performed by an operator.

Also, in this embodiment, in cases where the level ratio of the average residual signal to the first residual signal equal to or larger than the prescribed value, the transition to a double-talk state is detected in the detecting unit 210. However, it is applicable that a time-change of (N+1) power values of N residual signals and the first residual signal corresponding to (N+1), groups of the renewed first filter coefficients arranged in the renewing order be observed to detect the transition to a double-talk state according to the time-change and the level ratio. For example, in cases where it is detected in the detecting unit 210 according to the time-change that the power value is gradually increased with the time, because the group of the first filter coefficients renewed in the first adaptive filtering unit 205 gradually deteriorates, it is assumed that the transition to a double-talk state is detected. Therefore, in this case, the prescribed value is decreased, and the transition to a double-talk state can be immediately detected. In contrast, in cases where it is detected in the detecting unit 210 according to the time-change that the power value is gradually decreased with the time, because it is assumed that the single-talk state is continued, the prescribed value is increased. Therefore, the erroneous detection of the transition to a double-talk state can be prevented even though one group of the first filter coefficients renewed in the first adaptive filtering unit 205 is suddenly changed.

Also, in this embodiment, the group of the currently-renewed first filter coefficients is compared in the plural-group filter coefficient transmission control unit 214 with all the M groups of the first filter coefficients stored in the filter coefficient storing unit 212. However, it is applicable that the group of the currently-renewed first filter coefficients be compared with one or more groups of the first filter coefficients selected from the M groups of the first filter coefficients.

Embodiment 6

Figure 6:
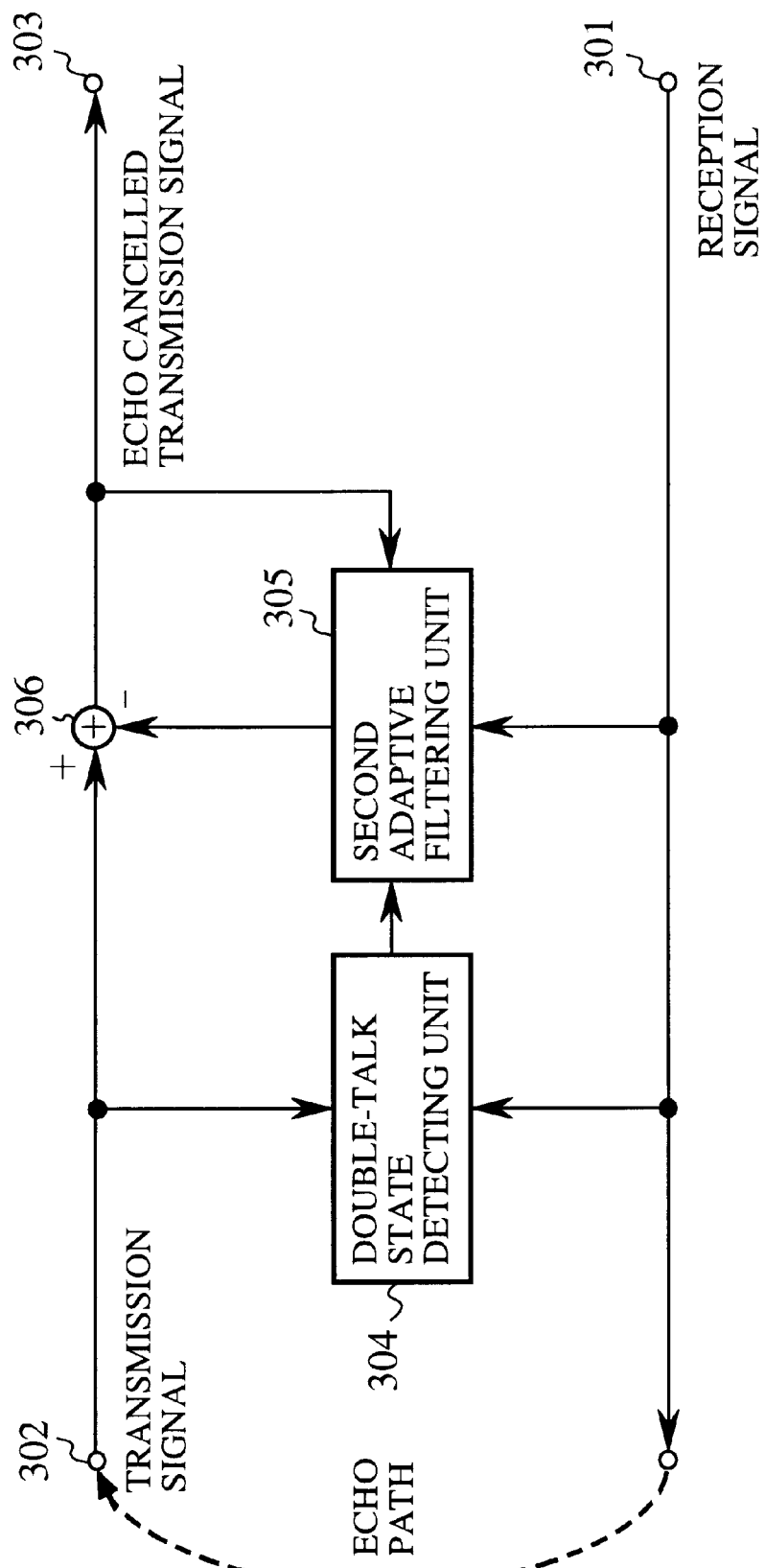
FIG. 6 is a block diagram of an echo canceller according to a sixth embodiment of the present invention.

FIG. 6 is a block diagram of an echo canceller using the double-talk detecting apparatus shown in FIG. 1 or FIG. 2 according to a sixth embodiment of the present invention.

As shown in FIG. 6, a reference numeral 304 denotes a double-talk state detecting unit, in which the double-talk detecting apparatus according to the first embodiment, the second embodiment, the third embodiment, the fourth embodiment or the fifth embodiment is combined with a conventional double-talk detecting apparatus for detecting a voiceless state and a double-talk state occurring in the second state transition. The double-talk state detecting unit 304 detects a double-talk state occurring in the first state transition, a double-talk state occurring in the second state transition or a voiceless state of a reception signal (or no voice of a far-end caller), received at an input terminal 301 according to the reception signal indicating a voice of the far-end caller and a transmission signal, in which an echo signal of the reception signal transmitted through an echo path of a near-end caller's side is superposed on a near-end caller's voice in a double-talk state, received at an input terminal 302 and outputs a double-talk detecting result indicating the detection of the double-talk state occurring in the first or second state transition or the detection of the voiceless state of the reception signal.

A reference numeral 305 denotes a second adaptive filtering unit having second filter coefficients. The second adaptive filtering unit 305 renews the second filter coefficients to make an impulse response based on the first filter coefficients approximate an actual impulse response of the echo path of the near-end caller's side, according to an echo cancelled transmission signal, which indicates a difference between the transmission signal and a third pseudo-echo signal obtained from the reception signal, when no double-talk detecting result is received from the double-talk state detecting unit 304, and performs a convolution calculation of the impulse response of the echo path for the reception signal received at the input terminal 301 according to the renewed second filter coefficients to produce the third pseudo-echo signal.

A reference numeral 306 denotes a third subtracting unit, and the third subtracting unit 306 subtracts the third pseudo-echo signal produced in the second adaptive filtering unit 305 from the transmission signal received at the input terminal 302 to produce the echo cancelled transmission signal, in which the echo signal is removed from the transmission signal, returns the echo cancelled transmission signal to the second adaptive filtering unit 305 and outputs the echo cancelled transmission signal from an output terminal 303 to the far-end caller through a transmission path.

In the above configuration, an operation of the echo canceller is described.

In the double-talk state detecting unit 304, a double-talk state occurring in the first state transition, a double-talk state occurring in the second state transition or a voiceless state of the reception signal (or no voice of the far-end caller) is detected according to-the reception signal and the transmission signal, and a double-talk detecting result indicating the detection of the double-talk state occurring in the first or second state transition or the detection of the voiceless state of the reception signal is output to the second adaptive filtering unit 305.

In the unit 305, a convolution calculation of the impulse response of the echo path is performed for the reception signal according to the second filter coefficients to produce a third pseudo-echo signal. The third pseudo-echo signal is subtracted from the transmission signal in the third subtracting unit 306, so that an echo cancelled transmission signal is produced. The echo cancelled transmission signal is input to the second adaptive filtering unit 305.

In the unit 305, when no double-talk detecting result is received from the double-talk state detecting unit 304, the second filter coefficients are renewed according to the echo cancelled transmission signal to make an impulse response based on the first filter coefficients approximate an actual impulse response of the echo path of the near-end caller's side, so that the third pseudo-echo signal approximating the echo signal of the reception signal is produced.

The reason that the renewal of the second filter coefficients is performed in case of a talk state other than the double-talk states occurring in the first and second state transitions and the voiceless state of the reception signal is as follows. Assuming that, the second filter coefficients are renewed in the double-talk state of the first or second state transition, the second filter coefficients undesirably deteriorate. Also, in case of the voiceless state of the reception signal, because no echo signal is included in the transmission signal, the renewal of the second filter coefficients is not required.

Thereafter, the echo cancelled transmission signal adjusted according to the renewed second filter coefficients is produced in the third subtracting unit 306 and is output from the output terminal 303 to the far-end caller through a transmission path.

Accordingly, because the second filter coefficients are correctly renewed to produce the third pseudo-echo signal approximating the echo signal of the reception signal in case of a single-talk state occurring in the first state transition, even though the single-talk state is changed to the double-talk state, an echo of the far-end caller's voice superposed on a voice of the near-end caller in the double-talk state can be properly cancelled in the third subtracting unit 306 according to the third pseudo-echo signal, so that the deterioration of the second filter coefficients can be suppressed to a minimum. Therefore, the voice of the near-end caller can -be transmitted at a high speech quality even in the double-talk state.

Also, because the double-talk detecting apparatus according to the first or second embodiment is used to detect the double-talk state-, it is not required to judge whether or not the first filter coefficients are sufficiently converged, and the double-talk state can be reliably detected in the first state transition while lessening a detection delay and without depending on any environmental conditions.

Embodiment 7

Figure 7:
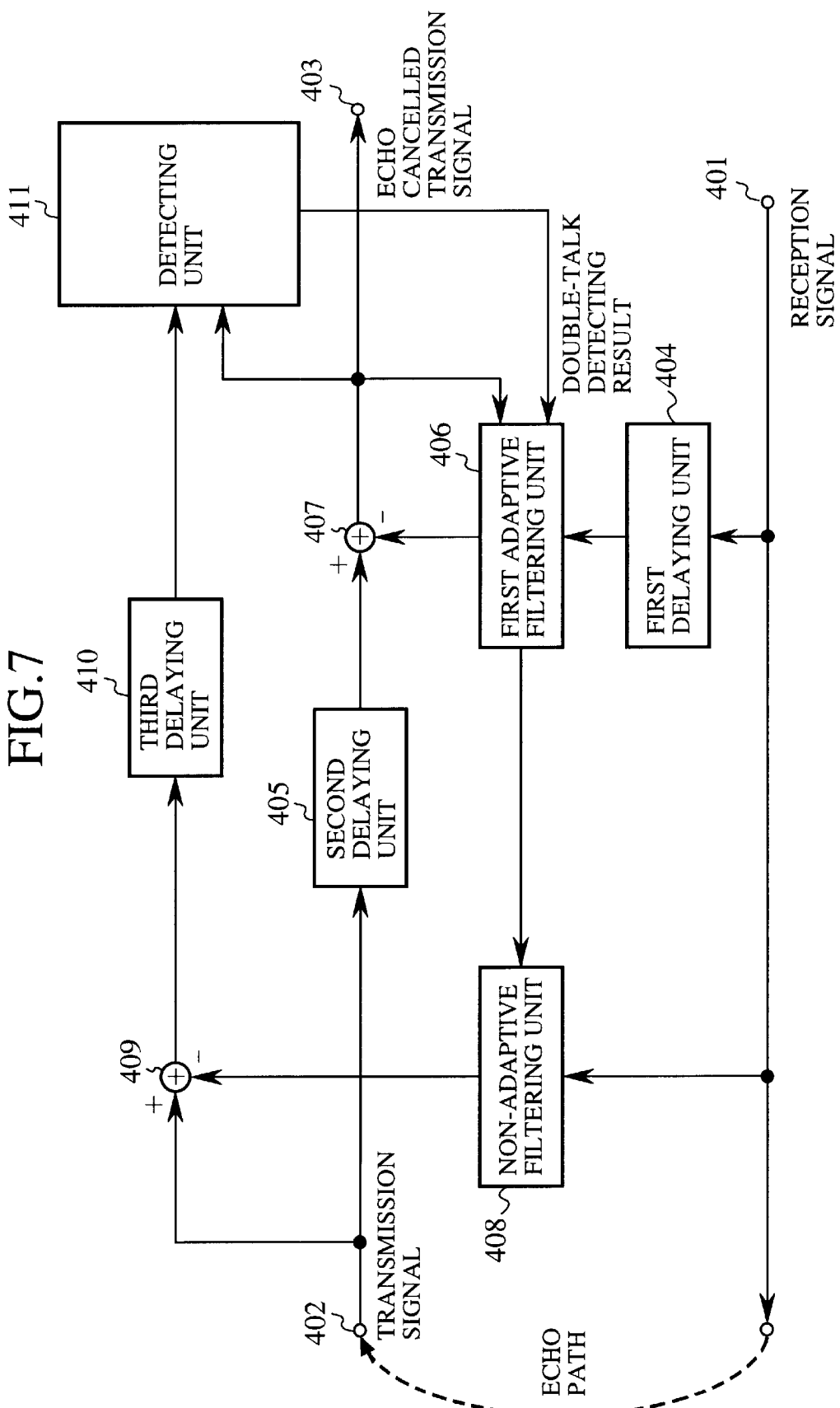
FIG. 7 is a block diagram of an echo canceller according to a seventh embodiment of the present invention.

FIG. 7 is a block diagram of an echo canceller using the double-talk detecting apparatus shown in FIG. 1 or FIG. 2 according to a seventh embodiment of the present invention.

As shown in FIG. 7, a reference numeral 401 denotes an input terminal, and the input terminal 401 receives a reception signal indicating a voice of a far-end caller transmitted through a transmission path.

A reference numeral 402 denotes an input terminal, and the input terminal 402 receives an echo signal of the reception signal transmitted from an output terminal of the reception signal through an echo path of a near-end caller's side, according to an acoustic coupling or the like as a transmission signal in a single-talk state and receives a transmission signal, in which the echo signal is superposed on a near-end caller's voice, in a double-talk state.

A reference numeral 404 denotes a first delaying unit, and the first delaying unit 404 delays the reception signal received at the input terminal 401 by a prescribed time-period T to produce a delayed reception signal.

A reference numeral 405 denotes a second delaying unit, and the second delaying unit 405 delays the transmission signal received at the input terminal 402 by the same prescribed time-period T to produce a delayed transmission signal.

A reference numeral 406 denotes a first adaptive filtering unit having first filter coefficients. The first adaptive filtering unit 406 renews the first filter coefficients to make an impulse response based on the first filter coefficients approximate an actual impulse response of the echo path of the near-end caller's side according to an echo cancelled transmission signal. The echo cancelled transmission signal indicates a difference between the delayed transmission signal and a first pseudo-echo signal obtained from the delayed reception signal when no double-talk detecting result indicating either the detection of a double-talk state occurring in the first or second state transition or the detection of a voiceless state of the reception signal is received. Also, the first adaptive filtering unit 406 performs a convolution calculation of the impulse response of the echo path for the delayed reception signal according to the renewed first filter coefficients to produce the first pseudo-echo signal. The renewed first filter coefficients deteriorate in the double-talk state.

A reference numeral 407 denotes a first subtracting unit. The first subtracting unit 407 subtracts the first pseudo-echo signal produced in the first adaptive filtering unit 406 from the delayed transmission signal produced in the second delaying unit 405 to produce the echo cancelled transmission signal in which an echo component of the reception signal indicated by the echo signal is removed in the single-talk state. Also, The first subtracting unit 407 returns the echo cancelled transmission signal to the first adaptive filtering unit 406 and outputs the echo cancelled transmission signal from an output terminal 403 to the far-end caller through a transmission path.

A reference numeral 408 denotes a non-adaptive filtering unit, the non-adaptive filtering unit 408 receives the renewed first filter coefficients, which is based on the reception signal received at the input terminal 401 at a past time prior to the current time by the prescribed time-period T, from the first adaptive filtering unit 406 and performs a convolution calculation of the impulse response of the echo path for the reception signal currently received at the input terminal 401 according to the renewed first filter coefficients to produce a second pseudo-echo signal in which a deterioration factor indicating the deterioration of the renewed first filter coefficients is included in the double-talk state.

A reference numeral 409 denotes a second subtracting unit, and the second subtracting unit 409 subtracts the second pseudo-echo signal produced in the non-adaptive filtering unit 408 from the transmission signal currently received in the input terminal 402 to produce a first residual signal indicating the deterioration of the renewed first filter coefficients.

A reference numeral 410 denotes a third delaying unit, and the third delaying unit 410 delays the first residual signal produced in the second subtracting unit 409 by the same prescribed time-period T to produce a delayed first residual signal.

A reference numeral 411 denotes a detecting unit in which the detecting unit 10 according to the first embodiment is combined with a conventional double-talk detecting apparatus for detecting a voiceless state and a double-talk state occurring in the second state transition. The detecting unit 411 judges whether or not a level ratio of the delayed first residual signal produced in the third delaying unit 410 to the echo cancelled transmission signal produced in the first subtracting unit 407 is equal to or larger than a prescribed value, detects a double-talk state occurring in the first state transition in cases where the level ratio is equal to or larger than the prescribed value, and outputs the double-talk detecting result indicating the detection of a double-talk state occurring in the first or second state transition or the detection of a voiceless state of the reception signal to the first adaptive filtering unit 406.

In the above configuration, an operation of the echo canceller is described.

In the first adaptive filtering unit 406, in cases where no double-talk detecting result indicating the detection of a double-talk state occurring in the first or second state transition or the detection of a voiceless state of the reception signal is received from the detecting unit 411, the renewal of the first filter coefficients and the production of a first pseudo-echo signal are performed in the same manner as in the first adaptive filtering unit 5 of the first embodiment. Thereafter, an echo cancelled transmission signal produced from the first pseudo-echo signal and a delayed transmission signal in the first subtracting unit 407 is input to the detecting unit 411.

Also, a second pseudo-echo signal is produced from the reception signal in the non-adaptive filtering unit 408 according to the renewed first filter coefficients transmitted from the first adaptive filtering unit 406 in the same manner as that produced. in the non-adaptive filtering unit 7 of the first embodiment. Thereafter, a first residual signal is produced in the second subtracting unit 409 in the same manner as the second residual signal produced in the second subtracting unit 8 of the first embodiment, a delayed first residual signal is produced in the third delaying unit 410 in the same manner as the delayed second residual signal of the first embodiment, and the delayed first residual signal is input to the detecting unit 411.

In the detecting unit 411, a double-talk state occurring in the first state transition, a double-talk state occurring in the second state transition or a voiceless state of the reception signal (or no voice of the far-end caller) is detected according to the delayed first residual signal and the echo cancelled transmission signal, and the double-talk detecting result indicating the detection of the double-talk state occurring in the first or second state transition or the detection of the voiceless state of the reception signal is output to the first adaptive filtering unit 406.

Accordingly, because the first filter coefficients are correctly renewed to produce the first pseudo-echo signal approximating the echo signal of the reception signal in case of a single-talk state, even though the single-talk state is changed to the double-talk state, an echo of the far-end caller's voice superposed on a voice of the near-end caller in the double-talk state can be properly cancelled in the first subtracting unit 407 according to the first pseudo-echo signal, so that the deterioration of the first filter coefficients can be suppressed to a minimum. Therefore, the voice of the near-end caller can be transmitted at a high speech quality even in the double-talk state.

Also, because the double-talk state in the first state transition is detected in the same manner as in the first embodiment, it is not required to judge whether or not the first filter coefficients are sufficiently converged, and the double-talk state can be reliably detected in the first state transition while lessening a detection delay and without depending on any environmental conditions.

Also, because neither second adaptive filtering unit 305 nor the third subtracting unit 306 used in the sixth embodiment is not required, the echo canceller, in which a date processing volume and a memory capacity are reduced, can be obtained as compared with that in the sixth embodiment.

Embodiment 8

Figure 8:
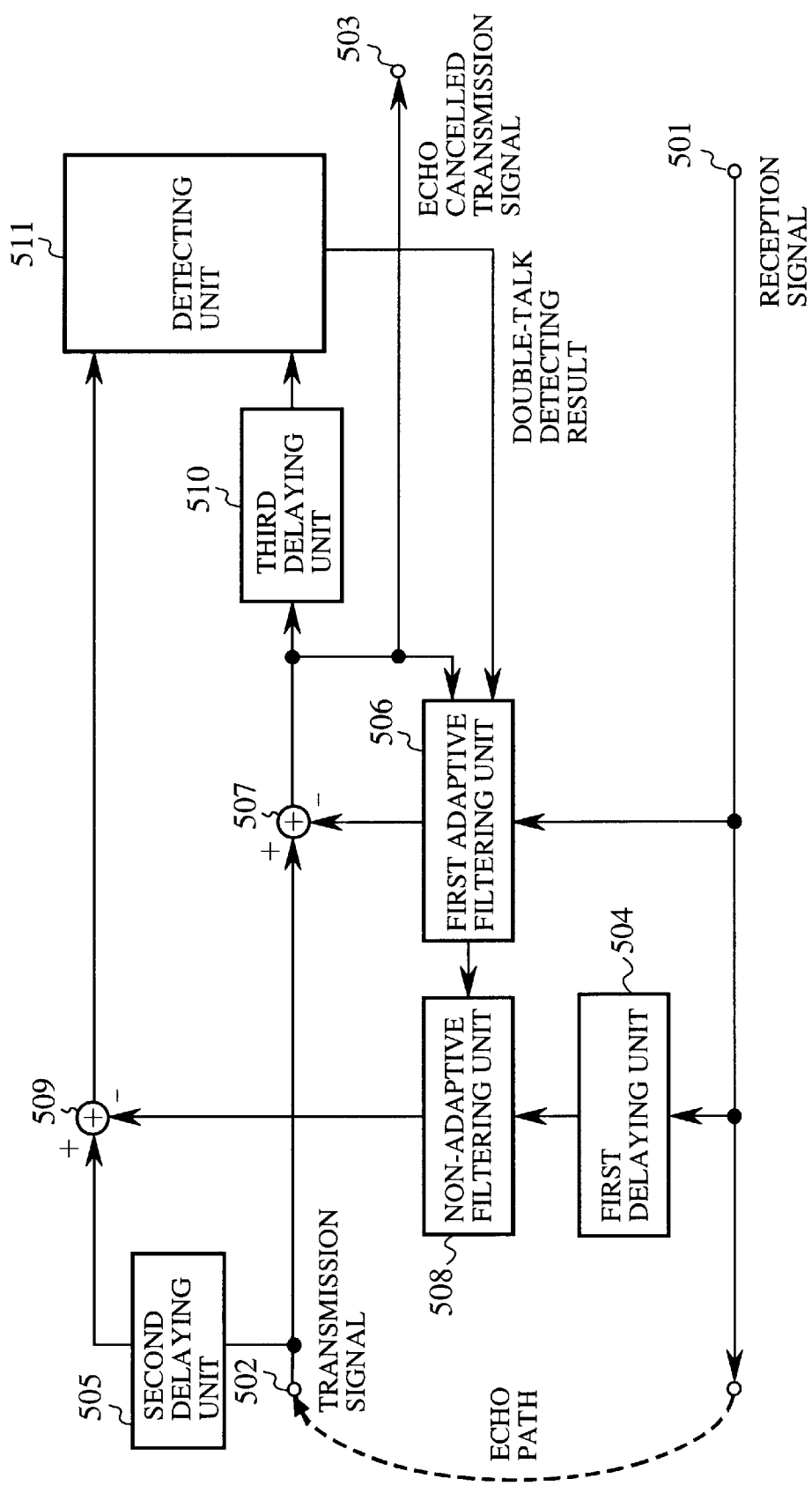
FIG. 8 is a block diagram of an echo canceller according to an eighth embodiment of the present invention.

FIG. 8 is a block diagram of an echo canceller using the double-talk detecting apparatus shown in FIG. 2 according to an eighth embodiment of the present invention.

As shown in FIG. 8, a reference numeral 501 denotes an input terminal, and the input terminal 501 receives a reception signal indicating a voice of a far-end caller transmitted through a transmission path.

A reference numeral 502 denotes an input terminal, and the input terminal 502 receives an echo signal generated from the reception signal, which is transmitted from an output terminal of the reception signal through an echo path of a near-end caller's side, according to an acoustic coupling or the like as a transmission signal in a single-talk state of the first state transition and receives a transmission signal, in which the echo signal is superposed on a near-end caller's voice, in a double-talk state of the first state transition.

A reference numeral 504 denotes a first delaying unit, and the first delaying unit 504 delays the reception signal received at the input terminal 501 by a prescribed time-period T to produce a delayed reception signal.

A reference numeral 505 denotes a second delaying unit, and the second delaying unit 505 delays the transmission signal received at the input terminal 502 by the same prescribed time-period T to produce a delayed transmission signal.

A reference numeral 506 denotes a first adaptive filtering unit having first filter coefficients. The first adaptive filtering unit !506 renews the first filter coefficients to make an impulse response based on the first filter coefficients approximate an actual impulse response of the echo path of the near-end caller's side according to an echo cancelled transmission signal. The echo cancelled transmission signal indicates a difference between the transmission signal currently received and a first pseudo-echo signal obtained from the reception signal currently received when no double-talk detecting result indicating either the detection of a double-talk state occurring in the first or second state transition or the detection of a voiceless state of the reception signal is received. Also, the first adaptive filtering unit 506 performs a convolution calculation of the impulse response of the echo path for the reception signal currently received according to the renewed first filter coefficients to produce the first pseudo-echo signal. The renewed first filter coefficients deteriorate in the double-talk state.

A reference numeral 507 denotes a first subtracting unit, the first subtracting unit. 507 subtracts the first pseudo-echo signal produced in the first adaptive filtering unit 506 from the transmission signal currently received at the input terminal 502 to produce the echo cancelled transmission signal, in which an echo component of the reception signal indicated by the echo signal is removed in the single-talk state, returns the echo cancelled transmission signal to the first adaptive filtering unit 506 and outputs the echo cancelled transmission signal from an output terminal 503 to the far-end caller through a transmission path.

A reference numeral 510 denotes a third delaying unit, and the third delaying unit 510 delays the echo cancelled transmission signal produced in the first subtracting unit 507 by the same prescribed time-period T to produce a second residual signal.

A reference numeral 508 denotes a non-adaptive filtering unit. The non-adaptive filtering unit 508 receives the renewed first filter coefficients, which is based on the reception signal received at the input terminal 501 at the current time, from the first adaptive filtering unit 506. Also, the non-adaptive filtering unit 508 performs a convolution calculation of the impulse response of the echo path for the delayed reception signal, which is based on the reception signal received at the input terminal 501 at a past time prior to the current time by the prescribed time-period T, according to the renewed first filter coefficients. Therefore, a second pseudo-echo signal, in which a deterioration factor indicating the deterioration of the renewed first filter coefficients is included, is produced.

A reference numeral 509 denotes a second subtracting unit, and the second subtracting unit 509 subtracts the second pseudo-echo signal produced in the non-adaptive filtering unit 508 from the delayed transmission signal produced in the second delaying unit 505 to produce a first residual signal indicating the deterioration of the renewed first filter coefficients.

A reference numeral 511 denotes a detecting unit in which the detecting unit 110 according to the second embodiment is combined with a conventional double-talk detecting apparatus for detecting a voiceless state and a double-talk state occurring in the second state transition. The detecting unit 511 judges whether or not a level ratio of the first residual signal produced in the second subtracting unit 509 to the second residual signal produced in the third delaying unit 510 is equal to or larger than a prescribed value detects a double-talk state occurring in the first state transition in cases where the level ratio is equal to or larger than the prescribed value, and outputs the double-talk detecting result indicating the detection of a double-talk state occurring in the first or second state transition or the detection of a voiceless state of the reception signal to the first adaptive filtering unit 506.

In the above configuration, an operation of the echo canceller is described.

In the first adaptive filtering unit 506, in cases where no double-talk detecting result indicating the detection of a double-talk state occurring in the first or second state transition or the detection of a voiceless state of the reception signal is received from the detecting unit 411, the renewal of the first filter coefficients and the production of a first pseudo-echo signal are performed in the same manner as in the first adaptive filtering unit 105 of the second embodiment. Thereafter, an echo cancelled transmission signal is produced in the first subtracting unit 507 from the first pseudo-echo signal and a transmission signal currently received and is output from an output terminal 503 to a far-end caller through a transmission path, a delayed second residual signal is produced in the third delaying unit 510 by delaying the echo cancelled transmission signal by the prescribed time-period T, and the delayed second residual signal is input to the detecting unit 511.

Also, a second pseudo-echo signal is produced from the delayed reception signal in the non-adaptive filtering unit 508 according to the renewed first filter coefficients transmitted from the first adaptive filtering unit 5.06 in the same manner as that produced in the non-adaptive filtering unit 107 of the second embodiment. Thereafter, a first residual signal is produced in the second subtracting unit 509 in the same manner as that produced in the second subtracting unit 108 of the second embodiment, and the first residual signal is input to the detecting unit 511.

In the detecting unit 511, a double-talk state occurring in the first state transition, a double-talk state occurring in the second state transition or a voiceless state of the reception signal (or no voice of the far-end caller) is detected according to the first residual signal and the delayed second residual signal, and the double-talk detecting result indicating the detection of the double-talk state occurring in the first or second state transition or the detection of the voiceless state of the reception signal is output to the first adaptive filtering unit 506.

Accordingly, because the first filter coefficients are correctly renewed to produce the first pseudo-echo signal approximating the echo signal of the reception signal in case of a single-talk state, even though the single-talk state is changed to the double-talk state, an echo of the far-end caller's voice superposed on a voice of the near-end caller in the double-talk state can be properly cancelled in the first subtracting unit 507 according to the first pseudo-echo signal, so that the deterioration of the first filter coefficients can be suppressed to a minimum. Therefore, the voice of the near-end caller can be transmitted at a high speech quality even in the double-talk state.

Also, because the double-talk state in the first state transition is detected in the same manner as in the second embodiment, it is not required to judge whether or not the first filter coefficients are sufficiently converged, and the double-talk state can be reliably detected in the first state transition while lessening a detection delay and without depending on any environmental conditions.

Also, because neither second adaptive filtering unit 305 nor the third subtracting unit 306 used in the sixth embodiment is not required, the echo canceller, in which a date processing volume and a memory capacity are reduced, can be obtained as compared with that in the sixth embodiment.

Also, because the echo cancelled transmission signal is produced from the transmission signal currently received, no delaying operation is performed for the echo cancelled transmission signal. Therefore, the echo cancelled transmission signal can be promptly transmitted to the far-end caller as compared with the transmission of the echo cancelled transmission signal in the seventh embodiment.

Embodiment 9

Figure 9:
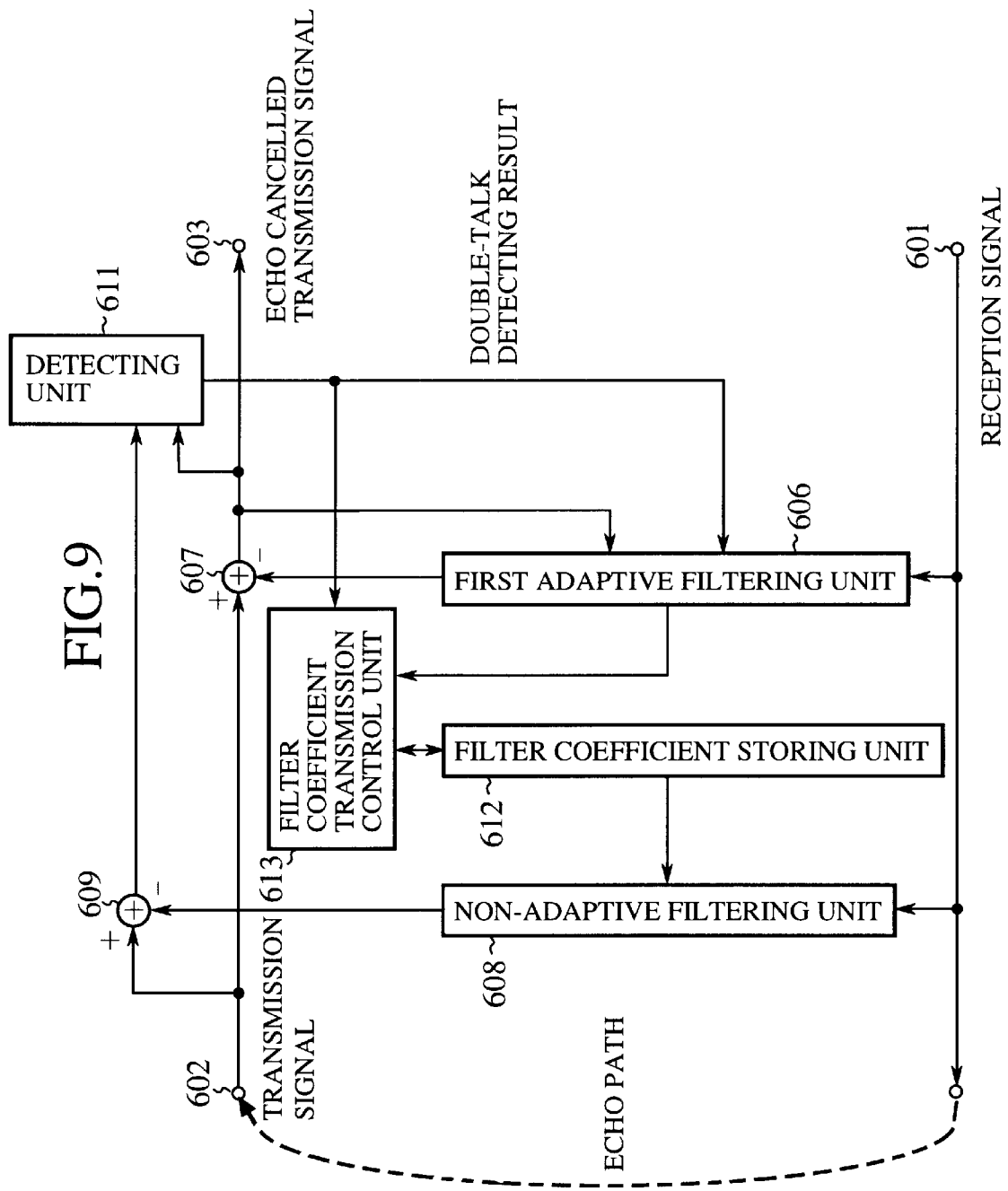
FIG. 9 is a block diagram of an echo canceller according to a ninth embodiment of the present invention.

FIG. 9 is a block diagram of an echo canceller using the double-talk detecting apparatus shown in FIG. 4 according to an eighth embodiment of the present invention.

As shown in FIG. 9, a reference numeral 601 denotes an input terminal, and the input terminal 601 receives a reception signal indicating a voice of a far-end caller transmitted through a transmission path.

A reference numeral 602 denotes an input terminal, and the input terminal 602 receives an echo signal generated from the reception signal, which is transmitted from an output terminal of the reception signal through an echo path of a near-end caller's side, according to an acoustic coupling or the like as a transmission signal in a single-talk state of the first state transition and receives a transmission signal, in which the echo signal is superposed on a near-end caller's voice, in a double-talk state of the first state transition.

A reference numeral 606 denotes a first adaptive filtering unit having first filter coefficients. The first adaptive filtering unit 606 renews the first filter coefficients to make an impulse response based on the first filter coefficients approximate an actual impulse response of the echo path. of the near-end caller Is side according to an echo cancelled transmission signal. The echo cancelled- transmission signal indicates a difference between the transmission signal currently received and a first pseudo-echo signal obtained from the reception signal currently received when no double-talk detecting result indicating e 1 the detection of a double-talk state occurring in the first or second state transition or the detection of a voiceless state of the reception signal is received. Also, the first adaptive filtering unit 606 performs a convolution calculation of the impulse response of the echo path for the reception signal currently received according to the renewed first filter coefficients to produce the first pseudo-echo signal. The renewed first filter coefficients deteriorate in the double-talk state.

A reference numeral 607 denotes a first subtracting unit, the first subtracting unit 607 subtracts the first pseudo-echo signal produced in the first adaptive filtering unit 606 from the transmission signal currently received at the input terminal 602 to produce the echo cancelled transmission signal, in which an echo component of the reception signal indicated by the echo signal is removed in the single-talk state, returns the echo cancelled transmission signal to the first adaptive filtering unit 606 and outputs the echo cancelled transmission signal from an output terminal 603 to the far-end caller through a transmission path.

A reference numeral 612 denotes a filter coefficient storing unit, and the filter coefficient storing unit 612 receives a group of the first filter coefficients currently-renewed in the first adaptive filtering unit 606 each time the group of the first filter coefficients are renewed in the first adaptive filtering unit 606 and repeatedly stores the group of the renewed first filter coefficients, while abandoning the (N+1)-th group of the first filter coefficients renewed just before the N renewal operations recently performed, to always store N groups of the renewed first filter coefficients recently obtained. The i-th group (i=2,3, . . . , N) of the renewed first filter coefficients is obtained just before the (i−1)-th renewed first filter coefficients.

A reference numeral 613 denotes a filter coefficient transmission control unit. The filter coefficient transmission control unit 613 controls the transmission of a group of the first filter coefficients currently renewed in the first adaptive filtering unit 606. That is, the filter coefficient transmission control unit 613 compares the group of the currently-renewed first filter coefficients with the N groups of the first filter coefficients stored in the filter coefficient storing unit 612, the filter coefficient transmission control unit 613 abandons the group of the currently-renewed first filter coefficients in cases where it is judged according to a double-talk detecting result that the group of the currently-renewed first filter coefficients considerably deteriorates or the group of the currently-renewed first filter coefficients is almost the same as the N groups of the first filter coefficients stored in the filter coefficient storing unit 612, the filter coefficient transmission control unit 613 allows the adoption of the group of the currently-renewed first filter coefficients in cases where the abandoning of the group of the currently-renewed first filter coefficients is not judged, and the filter coefficient transmission control unit 613 transmits the adoption-allowed group of the currently-renewed first filter coefficients to the filter coefficient storing unit 612 to store the group of the currently-renewed first filter coefficients in the filter coefficient storing unit 612 as the first group of the first filter coefficients renewed.

A reference numeral 608 denotes a non-adaptive filtering unit, the non-adaptive filtering unit 608 receives the N-th group of the first filter coefficients from the filter coefficient storing unit 612 and performs a convolution calculation of the impulse response of the echo path for the reception signal currently received at the input terminal 601, according to the N-th group of the renewed first filter coefficients to produce a second pseudo-echo signal in which a deterioration factor indicating the deterioration of the renewed first filter coefficients is included. N times of the renewal time-period is equivalent to the prescribed time-period T.

A reference numeral 609 denotes a second subtracting unit, and the second subtracting unit 609 subtracts the second pseudo-echo signal produced in the non-adaptive filtering unit 608 from the transmission signal currently received at the input terminal 602 to produce a first residual signal indicating the deterioration of the renewed first filter coefficients.

A reference numeral 611 denotes a detecting unit. The detecting unit 611 judges whether or not a level ratio of the first residual signal produced in the second subtracting unit 609 to the echo cancelled transmission signal produced in the first subtracting unit 607 is equal to or larger than a prescribed value, the detecting unit 611 detects a talk state as a double-talk state in cases where the level ratio is equal to or larger than the prescribed value, and the detecting unit 611 outputs the double-talk detecting result to the filter coefficient transmission control unit 613 and the first adaptive filtering unit 606.

In the above configuration, an operation of the echo canceller is described.

In the first adaptive filtering unit 606, in cases where no double-talk detecting result indicating the detection of a double-talk state occurring in the first or second state transition or the detection of a voiceless state of the reception signal is received from the detecting unit 611, the renewal of the first filter coefficients and the production of a first pseudo-echo signal are performed in the same manner as in the first adaptive filtering unit 105 of the second embodiment. Thereafter, an echo cancelled transmission signal is produced in the first subtracting unit 607 from the first pseudo-echo signal and a transmission signal currently received. The echo cancelled transmission signal is output from an output terminal 603 to a far-end caller through a transmission path and is input to the detecting unit 611. Also, the group of the first filter coefficients currently-renewed is sent to the filter coefficient transmission control unit 613.

Thereafter, in the control unit 613, the group of the currently-renewed first filter coefficients is abandoned or adopted in the same manner as in the filter coefficient transmission control unit 213 of the fourth embodiment, the adopted group of the currently-renewed first filter coefficients is transmitted to the filter coefficient storing unit 612 to always store N groups of the first filter coefficients recently renewed in the first adaptive filtering unit 606 in the same manner as the storing of the filter coefficient storing unit 212 of the fourth embodiment.

Thereafter, in the non-adaptive filtering unit 608, a second pseudo-echo signal is produced from a reception signal currently received at the input terminal 601 according to the N-th group of the first filter coefficients oldest in the storing unit 612 in the same manner as in the non-adaptive filtering unit 207 of the fourth embodiment, a first residual signal is produced in the second subtracting unit 609 from a transmission signal currently received and the second pseudo-echo signal, and the double-talk state is detected according to the echo cancelled transmission signal and the first residual signal in the same manner as in the fourth embodiment.

Accordingly, because the first filter coefficients are correctly renewed to produce the first pseudo-echo signal approximating the echo signal of the reception signal in case of a single-talk state, even though the single-talk state is changed to the double-talk state, an echo of the far-end caller's voice superposed on a voice of the near-end caller in the double-talk state can be properly cancelled in the first subtracting unit 607 according to the first pseudo-echo signal,-so that the deterioration of the first filter coefficients can be suppressed to a minimum. Therefore, the voice of the near-end caller can be transmitted at a high speech quality even in the double-talk state.

Also, because the double-talk state in the first state transition is detected in the same manner as in the second embodiment, it is not required to judge whether or not the first filter coefficients are sufficiently converged, and the double-talk state can be reliably detected in the first state transition while lessening a detection delay and without depending on any environmental conditions.

Also, because neither second adaptive filtering unit 305 nor the third subtracting unit 306 used in the sixth embodiment is not required, the echo canceller, in which a date processing volume and a memory capacity are reduced, can be obtained as compared with that in the sixth embodiment.

Also, because the echo cancelled transmission signal and the first residual signal used for the detection of the double-talk state are produced from the transmission signal and reception signal currently received without using any delaying unit, the transition to the double-talk state can be promptly detected as compared with in the seventh and eighth embodiments.

In this embodiment, the echo canceller is obtained by using the double-talk detecting apparatus of the fourth embodiment. However, it is applicable that the echo canceller be obtained by using the double-talk detecting apparatus of the third or fifth embodiment.

Embodiment 10

Figure 10:
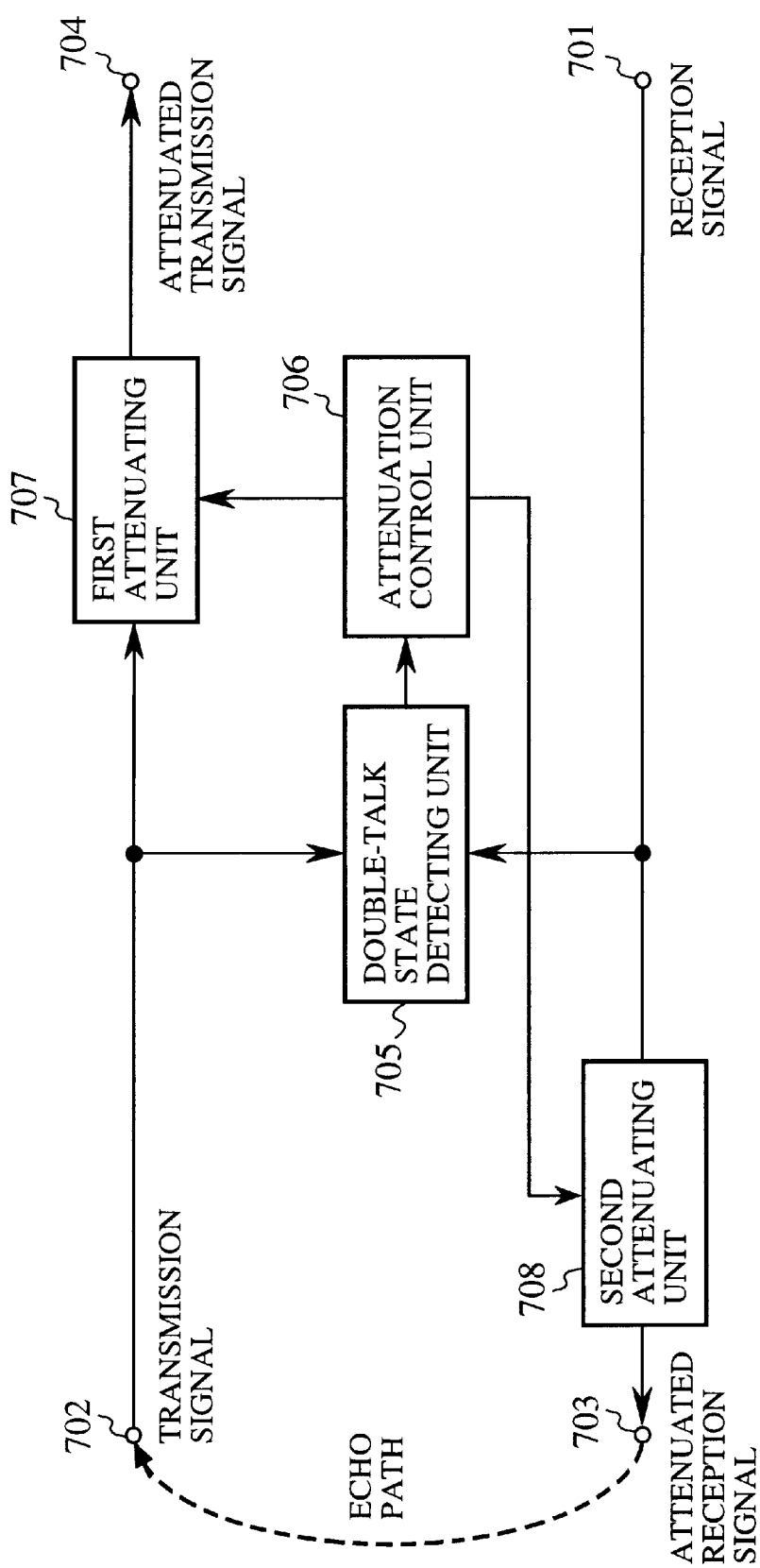
FIG. 10 s a block diagram of an echo suppressor according to a tenth embodiment of the present invention.

FIG. 10 is a block diagram of an echo suppressor using the double-talk detecting apparatus shown in FIG. 1 or FIG. 2 according to a tenth embodiment of the present invention.

As shown in FIG. 10, a reference numeral 705 denotes a double-talk state detecting unit, and the double-talk state detecting unit 705 has the same configuration and function as the double-talk state detecting unit 304 of the sixth embodiment.

A reference numeral 706 denotes an attenuation control unit, and the attenuation control unit 706 receives a double-talk detecting result indicating the detection of the double-talk state occurring in the first or second state transition or the detection of the voiceless state of the reception signal from the double-talk state detecting unit 705, generates a transmission attenuation control signal indicating an attenuation degree of a transmission signal received at an input terminal 702 according to the double-talk detecting result, and generates a reception attenuation control signal indicating an attenuation degree of a reception signal received at an input terminal 701 according to the double-talk detecting result.

A reference numeral 707 denotes a first attenuating unit, and the first attenuating unit 707 attenuates an amplitude of the transmission signal according to the transmission signal attenuation control signal generated in the attenuation control unit 706 to produce an attenuated transmission signal.

A reference numeral 708 denotes a second attenuating unit, and the second attenuating unit 708 attenuates an amplitude of* the reception signal according to the reception attenuation control signal generated in the attenuation control unit 706 to produce an attenuated reception signal.

In the above configuration, an operation of the echo suppressor is described.

In the attenuation control unit 706, a transmission attenuation control signal and a receiving attenuation control signal are generated according to an attenuation correspondence indicated in Table 1/G.164 of International Telecommunication union (ITU)-T Recommendation G.164. In detail, in cases where the double-talk detecting result indicates the double-talk state, the transmission attenuation control signal indicates an attenuation degree corresponding to an amplitude of the transmission signal., and the reception attenuation control signal indicates a fixed attenuation degree such as –6 dB. Also, in cases where no double-talk detecting result is input to the attenuation control unit 706, because a talk state is in the single-talk state, the transmission attenuation control signal indicates a fixed attenuation degree such as –50 dB, and the reception attenuation control signal indicates no attenuation.

Thereafter, the transmission signal is attenuated in the first attenuating unit 707 according to the transmission attenuation control signal, and an attenuated transmission signal is transmitted from an output terminal 704 to the far-end caller through a transmission path.

Also, in the second attenuating unit 708, the reception signal is attenuated according to the transmission attenuation control signal in case of the double-talk state, and a far-end caller's voice indicated by an attenuated reception signal is received by the near-end caller. In case of the single-talk state, because only a far-end caller's voice exists, the far-end caller's voice not attenuated is received by the near-end caller.

Accordingly, because the attenuation degrees of the transmission signal and the reception signal are adjusted according to the attenuation control signals, an echo of a far-end caller's voice can be suppressed in the double-talk state while reducing the interruption (or chopping) of a conversation.

Also, the conversation can be performed at a high speech quality.

Also, because the double-talk state in the first state transition is detected in the same manner as in the first or second embodiment, it is not required to judge whether or not the first filter coefficients are sufficiently converged, and the double-talk state can be reliably detected in the first state transition while lessening a detection delay and without depending on any environmental conditions.

As described above, the double-talk detecting apparatus, the echo canceller and the echo suppressor according to the present invention is suitable to detect the double-talk state, cancel an echo occurring on the near-end caller's side or suppress the echo, in the two-way communication system in which a near-end caller and a far-end caller communicate with each other through a transmission path, in cases where the single-talk state based on a voice of the far-end caller is changed to the double-talk state in which a voice of the near-end caller is added to the voice of the far-end caller.

What is claimed is:

1. A double-talk detecting apparatus for detecting a double-talk state changed from a single-talk state, comprising:

first adaptive filtering means for renewing first filter coefficients according to both a first residual signal, which is obtained from a transmission signal, indicates an echo component derived from a reception signal in the single-talk state and indicates the superposition of the echo component and a voice of a first caller in the double-talk state, and a first pseudo-echo signal, which approximates the echo component, and producing the first pseudo-echo signal from the reception signal according to the first filter coefficients renewed, the first filter coefficients deteriorating in the double-talk state;

non-adaptive filtering means for producing a second pseudo-echo signal, in which a deterioration factor indicating the deterioration of the first filter coefficients renewed is included in the double-talk state, from the reception signal according to the first filter coefficients which are renewed by the first adaptive filtering means according to the first residual signal;

delaying means for delaying, by a prescribed time-period, the reception signal which corresponds to a past time prior to a current time by the prescribed time-period and is input to the first adaptive filtering means, the reception signal which corresponds to the past time and is input to the non-adaptive filtering means or the transmission of the first filter coefficients renewed by the first adaptive filtering means at the past time to the non-adaptive filtering means to make the first adaptive filtering means produce the first pseudo-echo signal corresponding to the past time, to make the non-adaptive filtering means produce the second pseudo-echo signal corresponding to the past time or to produce the first filter coefficients corresponding to the past time;

first subtracting means for subtracting the first pseudo-echo signal produced by the first adaptive filtering means from the transmission signal corresponding to the current or past time, which is the same as that of the first pseudo-echo signal, to produce the first residual signal, which does not have the echo component included in the transmission signal in the single-talk state, and transmitting the first residual signal to the first adaptive filtering means;

second subtracting means for subtracting the second pseudo-echo signal produced by the non-adaptive filtering means from the transmission signal corresponding to the current or past time, which is the same as that of the second pseudo-echo signal, to produce a second residual signal which indicates the deterioration factor in the double-talk state and approximates the first residual signal in the single-talk state; and detecting means for detecting the double-talk state according to a difference between the second residual signal produced by the second subtracting means and the first residual signal produced by the first subtracting means.

2. A double-talk detecting apparatus according to claim 1, wherein the delaying means comprises:

first delaying means for receiving the reception signal corresponding to the past time and delaying the reception signal by the prescribed time-period to produce a delayed reception signal, the first pseudo-echo signal being produced from the delayed reception signal by the first adaptive filtering means; and second delaying means for receiving the transmission signal corresponding to the past time from the first caller and delaying the transmission signal by the prescribed time-period to produce a delayed transmission signal, the first pseudo-echo signal being subtracted from the delayed transmission signal by the first subtracting means, the second pseudo-echo signal is produced from the reception signal corresponding to the current time by the non-adaptive filtering means, the second pseudo-echo signal is subtracted from the transmission signal corresponding to the current time by the second subtracting means, the first filter coefficients renewed by the first adaptive filtering means at the current time are transmitted to the non-adaptive filtering means, and the double-talk detecting apparatus further comprises third delaying means for delaying the second residual signal produced by the second subtracting means by the prescribed time-period to produce a delayed second residual signal, the double-talk state being detected according to the difference between the delayed second residual signal and the first residual signal.

3. A double-talk detecting apparatus according to claim 1, wherein the delaying means comprises:

first delaying means for receiving the reception signal corresponding to the past time and delaying the reception signal by the prescribed time-period to produce a delayed reception signal corresponding to the past time, the second pseudo-echo signal being produced from the delayed reception signal by the non-adaptive filtering means; and second delaying means for receiving the transmission signal corresponding to the past time from the first caller and delaying the transmission signal by the prescribed time-period to produce a delayed transmission signal, the second pseudo-echo signal being subtracted from the delayed transmission signal by the second subtracting means, the first pseudo-echo signal is produced from the reception signal corresponding to the current time by the first adaptive filtering means, the first pseudo-echo signal is subtracted from the transmission signal corresponding to the current time by the first subtracting means, the first filter coefficients renewed by the first adaptive filtering means at the current time are transmitted to the non-adaptive filtering means, and the double-talk detecting apparatus further comprises third delaying means for delaying the first residual signal produced by the first subtracting means by the prescribed time-period to produce a delayed first residual signal, the double-talk state being detected according to the difference between the second residual signal and the delayed first residual signal.

4. A double-talk detecting apparatus according to claim 1, wherein the delaying means comprises:

filter coefficient storing means for storing a group of the first filter coefficients renewed by the first adaptive filtering means each time the group of the first filter coefficients is renewed by the first adaptive filtering means and outputting the group of the first filter coefficients corresponding to the past time to the non-adaptive filtering means, the second pseudo-echo signal being produced from the reception signal corresponding to the current time according to the first filter coefficients corresponding to the past time, the first pseudo-echo signal is produced from the reception signal corresponding to the current time by the first adaptive filtering means, the first pseudo-echo signal is subtracted from the transmission signal corresponding to the current time by the first subtracting means, and the second pseudo-echo signal is subtracted from the transmission signal corresponding to the current time by the second subtracting means.

5. A double-talk detecting apparatus according to claim 4, further comprising:

filter coefficient transmission control means for controlling the transmission of a group of the first filter coefficients renewed by the first adaptive filtering means to the filter coefficient storing means according to a double-talk state detecting result obtained by the detecting means each time the group of the first filter coefficients is renewed by the first adaptive filtering means, the group of the first filter coefficients being stored in the filter coefficient storing means in cases where the group of the first filter coefficients is adopted by the filter coefficient transmission control means.

6. A double-talk detecting apparatus according to claim 4, wherein the non-adaptive filtering means comprises N non-adaptive filtering units (N is an integer) for respectively producing a j-th pseudo-echo signal (j=2,3, . . . , N+1), in which a deterioration factor indicating the deterioration of the first filter coefficients renewed is included in the double-talk state, from the reception signal corresponding to the current time according to one group of the first filter coefficients stored in the filter coefficient storing means, the N groups of the first filter coefficients being different from each other, and the second subtracting means comprises N second subtracting units, connected with the N non-adaptive filtering units in one-to-one correspondence, for respectively subtracting the j-th pseudo-echo signal produced by the corresponding non-adaptive filtering unit from the transmission signal corresponding to the current time to produce a j-th residual signal which indicates the deterioration factor in the double-talk state and approximates the first residual signal in the single-talk state, the double-talk state being detected by the detecting means according to a difference between the first residual signal and a group of one or more residual signals selected from the N residual signals.

7. A double-talk detecting apparatus according to claim 5, wherein the non-adaptive filtering means comprises N non-adaptive filtering units (N is an integer) for respectively producing a j-th pseudo-echo signal (j=2,3, . . . , N+1), in which a deterioration factor indicating the deterioration of the first filter coefficients renewed is included in the double-talk state, from the reception signal corresponding to the current time according to one group of the first filter coefficients stored in the filter coefficient storing means, the N groups of the first filter coefficients being different from each other, and the second subtracting means comprises N second subtracting units, connected with the N non-adaptive filtering units in one-to-one correspondence, for respectively subtracting the j-th pseudo-echo signal produced by the corresponding non-adaptive filtering unit from the transmission signal corresponding to the current time to produce a j-th residual signal which indicates the deterioration factor in the double-talk state and approximates the first residual signal in the single-talk state, the double-talk state being detected by the detecting means according to a difference between the first residual signal and a group of one or more residual signals selected from the N residual signals.

8. An echo canceller, comprising:

first adaptive filtering means for renewing first filter coefficients according to both a first residual signal, which is obtained from a transmission signal, indicates an echo component derived from a reception signal in a single-talk state and indicates the superposition of the echo component and a voice of a first caller in a double-talk state, and a first pseudo-echo signal, which approximates the echo component, and producing the first pseudo-echo signal from the reception signal according to the first filter coefficients renewed, the first filter coefficients deteriorating in the double-talk state;

non-adaptive filtering means for producing a second pseudo-echo signal, in which a deterioration factor indicating the deterioration of the first filter coefficients renewed is included in the double-talk state, from the reception signal according to the first filter coefficients which are renewed by the first adaptive filtering means according to the first residual signal;

delaying means for delaying, by a prescribed time-period, the reception signal which corresponds to a past time prior to a current time by the prescribed time-period and is input to the first adaptive filtering means, the reception signal which corresponds to the past time and is input to the non-adaptive filtering means or the transmission of the first filter coefficients renewed by the first adaptive filtering means at the past time to the non-adaptive filtering means to make the first adaptive filtering means produce the first pseudo-echo signal corresponding to the past time, to make the non-adaptive filtering means produce the second pseudo-echo signal corresponding to the past time or to produce the first filter coefficients corresponding to the past time;

first subtracting means for subtracting the first pseudo-echo signal produced by the first adaptive filtering means from the transmission signal corresponding to the current or past time, which is the same as that of the first pseudo-echo signal, to produce the first residual signal which does not have the echo component included in the transmission signal in the single-talk state and transmitting the first residual signal to the first adaptive filtering means;

second subtracting means for subtracting the second pseudo-echo signal produced by the non-adaptive filtering means from the transmission signal corresponding to the current or past time, which is the same as that of the second pseudo-echo signal, to produce a second residual signal which indicates the deterioration factor in the double-talk state and approximates the first residual signal in the single-talk state;

detecting means for detecting the double-talk state or the single-talk state according to a difference between the second residual signal produced by the second subtracting means and the first residual signal produced by the first subtracting means and outputting a talk state detecting signal indicating the detection of the double-talk state or the detection of the single-talk state;

second adaptive filtering means for renewing second filter coefficients according to an echo cancelled transmission signal obtained from the transmission signal of the current time and a third pseudo-echo signal approximating the echo component, in cases where the talk state detecting signal indicating the detection of the single-talk state is received from the detecting means, and producing the third pseudo-echo signal corresponding to the current time from the reception signal of the current time according to the second filter coefficients; and third subtracting means for subtracting the third pseudo-echo signal produced by the second adaptive filtering means from the transmission signal of the current time to produce the echo cancelled transmission signal, in which the echo component included in the transmission signal is removed, sending the echo cancelled transmission signal to the second adaptive filtering means to make the second adaptive filtering means renew the second filter coefficients and outputting the echo cancelled transmission signal.

9. An echo canceller according to claim 8, wherein the delaying means comprises:

first delaying means for receiving the reception signal corresponding to the past time and delaying the reception signal by the prescribed time-period to produce a delayed reception signal, the first pseudo-echo signal being produced from the delayed reception signal by the first adaptive filtering means; and second delaying means for receiving the transmission signal corresponds to the past time from the first caller and delaying the transmission signal by the prescribed time-period to produce a delayed transmission signal, the first pseudo-echo signal being subtracted from the delayed transmission signal by the first subtracting means, the second pseudo-echo signal is produced from the reception signal corresponding to the current time by the non-adaptive filtering means, the second pseudo-echo signal is subtracted from the transmission signal corresponding to the current time by the second subtracting means, the first filter coefficients renewed by the first adaptive filtering means at the current time are transmitted to the non-adaptive filtering means, and the echo canceller further comprises third delaying means for delaying the second residual signal produced by the second subtracting means by the prescribed time-period to produce a delayed second residual signal, the double-talk state being detected according to the difference between the delayed second residual signal and the first residual signal.

10. An echo canceller according to claim 8, wherein the delaying means comprises:

first delaying means for receiving the reception signal corresponding to the past time and delaying the reception signal by the prescribed time-period to produce a delayed reception signal corresponding to the past time, the second pseudo-echo signal being produced from the delayed reception signal by the non-adaptive filtering means; and second delaying means for receiving the transmission signal corresponds to the past time from the first caller and delaying the transmission signal by the prescribed time-period to produce a delayed transmission signal, the second pseudo-echo signal being subtracted from the delayed transmission signal by the second subtracting means, the first pseudo-echo signal is produced from the reception signal corresponding to the current time by the first adaptive filtering means, the first pseudo-echo signal is subtracted from the transmission signal corresponding to the current time by the first subtracting means, the first filter coefficients renewed by the first adaptive filtering means at the current time are transmitted to the non-adaptive filtering means, and the echo canceller further comprises
third delaying means for delaying the first residual signal produced by the first subtracting means by the prescribed time-period to produce a delayed first residual signal, the double-talk state being detected according to the difference between the second residual signal and the delayed first residual signal.

11. An echo canceller according to claim 8, wherein the delaying means comprises:
filter coefficient storing means for storing a group of the first filter coefficients renewed by the first adaptive filtering means each time the group of the first filter coefficients is renewed by the first adaptive filtering means and outputting the group of the first filter coefficients corresponding to the past time to the non-adaptive filtering means, the second pseudo-echo signal being produced from the reception signal corresponding to the current time according to the first filter coefficients corresponding to the past time,
the first pseudo-echo signal is produced from the reception signal corresponding to the current time by the first adaptive filtering means,
the first pseudo-echo signal is subtracted from the transmission signal corresponding to the current time by the first subtracting means, and
the second pseudo-echo signal is subtracted from the transmission signal corresponding to the current time by the second subtracting means.

12. An echo canceller according to claim 11, further comprising:
filter coefficient transmission control means for controlling the transmission of a group of the first filter coefficients renewed by the first adaptive filtering means to the filter coefficient storing means according to the talk state detecting signal output from the detecting means each time the group of the first filter coefficients is renewed by the first adaptive filtering means, the group of the first filter coefficients being stored in the filter coefficient storing means in cases where the group of the first filter coefficients is adopted by the filter coefficient transmission control means.

13. An echo canceller according to claim 11, wherein the non-adaptive filtering means comprises
N non-adaptive filtering units (N is an integer) for respectively producing a j-th pseudo-echo signal (j=2,3, . . . , N+1), in which a deterioration factor indicating the deterioration of the first filter coefficients renewed is included in the double-talk state, from the reception signal corresponding to the current time according to one group of the first filter coefficients stored in the filter coefficient storing means, the N groups of the first filter coefficients being different from each other, and
the second subtracting means comprises
N second subtracting units, connected with the N non-adaptive filtering units in one-to-one correspondence, for respectively subtracting the j-th pseudo-echo signal produced by the corresponding non-adaptive filtering unit from the transmission signal corresponding to the current time to produce a j-th residual signal which indicates the deterioration factor in the double-talk state and approximates the first residual signal in the single-talk state, the double-talk state being detected by the detecting means according to a difference between the first residual signal and a group of one or more residual signals selected from the N residual signals.

14. An echo canceller according to claim 12, wherein the non-adaptive filtering means comprises N non-adaptive filtering units (N is an integer) for respectively producing a j-th pseudo-echo signal (j=2,3, . . . , N+1), in which a deterioration factor indicating the deterioration of the first filter coefficients renewed is included in the double-talk state, from the reception signal corresponding to the current time according to one group of the first filter coefficients stored in the filter coefficient storing means, the N groups of the first filter coefficients being different from each other, and
the second subtracting means comprises
N second subtracting units, connected with the N non-adaptive filtering units in one-to-one correspondence, for respectively subtracting the j-th pseudo-echo signal produced by the corresponding non-adaptive filtering unit from the transmission signal corresponding to the current time to produce a j-th residual signal which indicates the deterioration factor in the double-talk state and approximates the first residual signal in the single-talk state, the, double-talk state being detected by the detecting means according to a difference between the first residual signal and a group of one or more residual signals selected from the N residual signals.

15. An echo canceller, comprising:
first adaptive filtering means for renewing first filter coefficients according to an echo cancelled transmission signal, which is obtained from a transmission signal, indicates an echo component derived from a reception signal in a single-talk state and indicates the superposition of the echo component and a voice of a first caller in a double-talk state, and a first pseudo-echo signal, which approximates the echo component, in cases where a talk state detecting signal indicating the detection of the single-talk state is received, and producing the first pseudo-echo signal from the reception signal according to the first filter coefficients renewed, the first filter coefficients deteriorating in the double-talk state;
non-adaptive filtering means for producing a second pseudo-echo signal, in which a deterioration factor indicating the deterioration of the first filter coefficients renewed is included in the double-talk state, from the reception signal according to the first filter coefficients which are renewed by the first adaptive filtering means according to the echo cancelled transmission signal;
delaying means for delaying, by a prescribed time-period, the reception signal which corresponds to a past time prior to a current time by the prescribed time-period and is input to the first adaptive filtering means, the reception signal which corresponds to the past time and is input to the non-adaptive filtering means or the transmission of the first filter coefficients, which are renewed by the first adaptive filtering means at the past time, to the non-adaptive filtering means to make the first adaptive filtering means produce the first pseudo-echo signal corresponding to the past time, to make the non-adaptive filtering means produce the second pseudo-echo signal corresponding to the past time or to produce the first filter coefficients corresponding to the past time;
first subtracting means for subtracting the first pseudo-echo signal produced by the first adaptive filtering means from the transmission signal corresponding to the current or past time, which is the same as that of the first pseudo-echo signal, to produce the echo cancelled transmission signal, which does not have the echo component included in the transmission signal in the single-talk state, and transmitting the echo cancelled transmission signal to the first adaptive filtering means;

second subtracting means for subtracting the second pseudo-echo signal produced by the non-adaptive filtering means from the transmission signal corresponding to the current or past time, which is the same as that of the second pseudo-echo signal, to produce a first residual signal which indicates the deterioration factor in the double-talk state and approximates the echo cancelled transmission signal in the single-talk state; and detecting means for detecting the double-talk state or the single-talk state according to a difference between the first residual signal produced by the second subtracting means and the echo cancelled transmission signal produced by the first subtracting means and outputting a talk state detecting signal indicating the detection of the double-talk state or the talk state detecting signal indicating the detection of the single-talk state to the first adaptive filtering means.

16. An echo canceller according to claim 15, wherein the delaying means comprises:

first delaying means for receiving the reception signal corresponding to the past time and delaying the reception signal by the prescribed time-period to produce a delayed reception signal, the first pseudo-echo signal being produced from the delayed reception signal by the first adaptive filtering means; and second delaying means for receiving the transmission signal corresponds to the past time from the first caller and delaying the transmission signal by the prescribed time-period to produce a delayed transmission signal, the first pseudo-echo signal being subtracted from the delayed transmission signal by the first subtracting means, the second pseudo-echo signal is produced from the reception signal corresponding to the current time by the non-adaptive filtering means, the second pseudo-echo signal is subtracted from the transmission signal corresponding to the current time by the second subtracting means, the first filter coefficients renewed by the first adaptive filtering means at the current time are transmitted to the non-adaptive filtering means, and the double-talk detecting apparatus further comprises third delaying means for delaying the first residual signal produced by the second subtracting means by the prescribed time-period to produce a delayed first residual signal, the double-talk state being detected according to the difference between the delayed first residual signal and the echo cancelled transmission signal.

17. An echo canceller according to claim 15, wherein the delaying means comprises:

first delaying means for receiving the reception signal corresponding to the past time and delaying the reception signal by the prescribed time-period to produce a delayed reception signal corresponding to the past time, the second pseudo-echo signal being produced from the delayed reception signal by the non-adaptive filtering means; and second delaying means for receiving the transmission signal corresponds to the past time from the first caller and delaying the transmission signal by the prescribed time-period to produce a delayed transmission signal, the second pseudo-echo signal being subtracted from the delayed transmission signal by the second subtracting means, the first pseudo-echo signal is produced from the reception signal corresponding to the current time by the first adaptive filtering means, the first pseudo-echo signal is subtracted from the transmission signal corresponding to the current time by the first subtracting means, the first filter coefficients renewed by the first adaptive filtering means at the current time are transmitted to the non-adaptive filtering means, and the double-talk detecting apparatus further comprises third delaying means for delaying the echo cancelled transmission signal produced by the first subtracting means by the prescribed time-period to produce a delayed second residual signal, the double-talk state being detected according to the difference between the first residual signal and the delayed second residual signal.

18. An echo canceller according to claim 15, wherein the delaying means comprises:

filter coefficient storing means for storing a group of the first filter coefficients renewed by the first adaptive filtering means each time the group of the first filter coefficients is renewed by the first adaptive filtering means and outputting the group of the first filter coefficients corresponding to the past time to the non-adaptive filtering means, the second pseudo-echo signal being produced from the reception signal corresponding to the current time according to the first filter coefficients corresponding to the past time, the first pseudo-echo signal is produced from the reception signal corresponding to the current time by the first adaptive filtering means, the first pseudo-echo signal is subtracted from the transmission signal corresponding to the current time by the first subtracting means, and the second pseudo-echo signal is subtracted from the transmission signal corresponding to the current time by the second subtracting means.

19. An echo canceller according to claim 18, further comprising:

filter coefficient transmission control means for controlling the transmission of a group of the first filter coefficients renewed by the first adaptive filtering means to the filter coefficient storing means according to the talk state detecting signal output from the detecting means each time the group of the first filter coefficients is renewed by the first adaptive filtering means, the group of the first filter coefficients being stored in the filter coefficient storing means in cases where the group of the first filter coefficients is adopted by the filter coefficient transmission control means.

20. An echo canceller according to claim 18, wherein the non-adaptive filtering means comprises N non-adaptive filtering units (N is an integer) for respectively producing a j-th pseudo-echo signal (j=2,3, . . . , N+1), in which a deterioration factor indicating the deterioration of the first filter coefficients renewed is included in the double-talk state, from the reception signal corresponding to the current time according to one group of the first filter coefficients stored in the filter coefficient storing means, the N groups of the first filter coefficients being different from each other, and the second subtracting means comprises N subtracting units, connected with the N non-adaptive filtering units in one-to-one correspondence, for respectively subtracting the j-th pseudo-echo signal produced by the corresponding non-adaptive filtering unit from the transmission signal corresponding to the current time to produce a j-th residual signal which indicates the deterioration factor in the double-talk state and approximates the echo cancelled transmission signal in the single-talk state, the double-talk state being detected by the detecting means according to a difference between the echo cancelled transmission signal and a group of one or more residual signals selected from the N residual signals.

21. An echo canceller according to claim 19, wherein the non-adaptive filtering means comprises N non-adaptive filtering units (N is an integer) for respectively producing a j-th pseudo-echo signal (j=2,3, . . . , N+1), in which a deterioration factor indicating the deterioration of the first filter coefficients renewed is included in the double-talk state, from the reception signal corresponding to the current time according to one group of the first filter coefficients stored in the filter coefficient storing means, the N groups of the first filter coefficients being different from each other, and the second subtracting means comprises N subtracting units, connected with the N non-adaptive filtering units in one-to-one correspondence, for respectively subtracting the j-th pseudo-echo signal produced by the corresponding non-adaptive filtering unit from the transmission signal corresponding to the current time to produce a j-th residual signal which indicates the deterioration factor in the double-talk state and approximates the echo cancelled transmission signal in the single-talk state, the double-talk state being detected by the detecting means according to a difference between the echo cancelled transmission signal and a group of one or more residual signals selected from the N residual signals.

22. An echo suppressor, comprising:

first adaptive filtering means for renewing first filter coefficients according to both a first residual signal, which is obtained from a transmission signal, indicates an echo component derived from a reception signal in a single-talk state and indicates the superposition of the echo component and a voice of a first caller in a double-talk state, and a first pseudo-echo signal, which approximates the echo component, and producing the first pseudo-echo signal from the reception signal according to the first filter coefficients renewed, the first filter coefficients deteriorating in the double-talk state;

non-adaptive filtering means for producing a second pseudo-echo signal, in which a deterioration factor indicating the deterioration of the first filter coefficients renewed is included in the double-talk state, from the reception signal according to the first filter coefficients which are renewed by the first adaptive filtering means according to the first residual signal;

delaying means for delaying, by a prescribed time-period, the reception signal which corresponds to a past time prior to a current time by the prescribed time-period and is input to the first adaptive filtering means, the reception signal which corresponds to-the past time and is input to the non-adaptive filtering means or the transmission of the first filter coefficients, which are renewed by the first adaptive filtering means at the past time, to the non-adaptive filtering means to make the first adaptive filtering means produce the first pseudo-echo signal corresponding to the past time, to make the non-adaptive filtering means produce the second pseudo-echo signal corresponding to the past time or to produce the first filter coefficients corresponding to the past time;

first subtracting means for subtracting the first pseudo-echo signal produced by the first adaptive filtering means from the transmission signal corresponding to the current or past time, which is the same as that of the first pseudo-echo signal, to produce the first residual signal, which does not have the echo component included in the transmission signal in the single-talk state, and transmitting the first residual signal to the first adaptive filtering means;

second subtracting means for subtracting the second pseudo-echo signal produced by the non-adaptive filtering means from the transmission signal corresponding to the current or past time, which is the same as that of the second pseudo-echo signal, to produce a second residual signal which indicates the deterioration factor in the double-talk state and approximates the first residual signal in the single-talk state;

detecting means for detecting the double-talk state or the single-talk state according to a difference between the second residual signal produced by the second subtracting means and the first residual signal produced by the first subtracting means and outputting a talk state detecting signal indicating the detection of the double-talk state or the detection of the single-talk state;

attenuation control means for receiving the talk state detecting signal from the detecting means, generating a transmission attenuation control signal indicating an attenuation degree of the transmission signal currently received according to the talk state detecting signal, and generating a reception attenuation control signal indicating an attenuation degree of the reception signal currently received according to the talk state detecting signal;

first attenuating means for attenuating the transmission signal currently received according to the transmission attenuation control signal generated by the attenuation control means to produce an attenuated transmission signal and outputting the attenuated transmission signal; and second attenuating means for attenuating the reception signal currently received according to the reception attenuation control signal generated by the attenuation control means to produce an attenuated reception signal and outputting the attenuated reception signal.

23. An echo suppressor according to claim 22, wherein the delaying means comprises:

first delaying means for receiving the reception signal corresponding to the past time and delaying the reception signal by the prescribed time-period to produce a delayed reception signal, the first pseudo-echo signal being produced from the delayed reception signal by the first adaptive filtering means; and second delaying means for receiving the transmission signal corresponding to the past time from the first caller and delaying the transmission signal by the prescribed time-period to produce a delayed transmission signal, the first pseudo-echo signal being subtracted from the delayed transmission signal by the first subtracting means, the second pseudo-echo signal is produced from the reception signal corresponding to the current time by the non-adaptive filtering means, the second pseudo-echo signal is subtracted from the transmission signal corresponding to the current time by the second subtracting means, the first filter coefficients renewed by the first adaptive filtering means at the current time are transmitted to the non-adaptive filtering means, and the echo suppressor further comprises third delaying means for delaying the second residual signal produced by the second subtracting means by the prescribed time-period to produce a delayed second residual signal, the double-talk state being detected according to the difference between the delayed second residual signal and the first residual signal.

24. An echo suppressor according to claim 22, wherein the delaying means comprises:

first delaying means for receiving the reception signal corresponding to the past time and delaying the reception signal by the prescribed time-period to produce a delayed reception signal corresponding to the past time, the second pseudo-echo signal being produced from the delayed reception signal by the non-adaptive filtering means; and second delaying means for receiving the transmission signal corresponds to the past time from the first caller and delaying the transmission signal by the prescribed time-period to produce a delayed transmission signal, the second pseudo-echo signal being subtracted from the delayed transmission signal by the second subtracting means, the first pseudo-echo signal is produced from the reception signal corresponding to the current time by the first adaptive filtering means, the first pseudo-echo signal is subtracted from the transmission signal corresponding to the current time by the first subtracting means, the first filter coefficients renewed by the first adaptive filtering means at the current time are transmitted to the non-adaptive filtering means, and the echo suppressor further comprises third delaying means for delaying the first residual signal produced by the first subtracting means by the prescribed time-period to produce a delayed first residual signal, the double-talk state being detected according to the difference between the second residual signal and the delayed first residual signal.

25. An echo suppressor according to claim 22, wherein the delaying means comprises:

filter coefficient storing means for storing a group of the first filter coefficients renewed by the first adaptive filtering means each time the group of the first filter coefficients is renewed by the first adaptive filtering means and outputting the group of the first filter coefficients corresponding to the past time to the non-adaptive filtering means, the second pseudo-echo signal being produced from the reception signal corresponding to the current time according to the first filter coefficients corresponding to the past time, the first pseudo-echo signal is produced from the reception signal corresponding to the current time by the first adaptive filtering means, the first pseudo-echo signal is subtracted from the transmission signal corresponding to the current time by the first subtracting means, and the second pseudo-echo signal is subtracted from the transmission signal corresponding to the current time by the second subtracting means.

26. An echo suppressor according to claim 25, further comprising:

filter coefficient transmission control means for controlling the transmission of a group of the first filter coefficients renewed by the first adaptive filtering means to the filter coefficient storing means according to the talk state detecting signal output from the detecting means each time the group of the first filter coefficients is renewed by the first adaptive filtering means, the group of the first filter coefficients being stored in the filter coefficient storing means in cases where the group of the first filter coefficients is adopted by the filter coefficient transmission control means.

27. An echo suppressor according to claim 25, wherein the non-adaptive filtering means comprises N non-adaptive filtering units (N is an integer) for respectively producing a j-th pseudo-echo signal (j=2,3, ..., N+1), in which a deterioration factor indicating the deterioration of the first filter coefficients renewed is included in the double-talk state, from the reception signal corresponding to the current time according to one group of the first filter coefficients stored in the filter coefficient storing means, the N groups of the first filter coefficients being different from each other, and the second subtracting means comprises N second subtracting units, connected with the N non-adaptive filtering units in one-to-one correspondence, for respectively subtracting the j-th pseudo-echo signal produced by the corresponding non-adaptive filtering unit from the transmission signal corresponding to the current *time to produce a j-th residual signal which indicates the deterioration factor in the double-talk state and approximates the first residual signal in the single-talk state, the double-talk state being detected by the detecting means according to a difference between the first residual signal and a group of one or more residual signals selected from the N residual signals.

28. An echo suppressor according to claim 26, wherein the non-adaptive filtering means comprises N non-adaptive filtering units (N is an integer) for respectively producing a j-th pseudo-echo signal (j=2,3, ..., N+1), in which a deterioration factor indicating the deterioration of the first filter coefficients renewed is included in the double-talk state, from the reception signal corresponding to the current time according to one group of the first filter coefficients stored in the filter coefficient storing means, the N groups of the first filter coefficients being different from each other, and the second subtracting means comprises N second subtracting units, connected with the N non-adaptive filtering units in one-to-one correspondence, for respectively subtracting the j-th pseudo-echo signal produced by the corresponding non-adaptive filtering unit from the transmission signal corresponding to the current time to produce a j-th residual signal which indicates the deterioration factor in the double-talk state and approximates the first residual signal in the single-talk state, the double-talk state being detected by the detecting means according to a difference between the first residual signal and a group of one or more residual signals selected from the N residual signals.

* * * * *